(12) United States Patent
Wang et al.

(10) Patent No.: US 8,214,182 B2
(45) Date of Patent: Jul. 3, 2012

(54) METHODS OF PREDICTING RESIDUAL STRESSES AND DISTORTION IN QUENCHED ALUMINUM CASTINGS

(75) Inventors: Qigui Wang, Rochester Hills, MI (US);
Cherng-Chi Chang, Troy, MI (US);
David Paluch, Saginaw, MI (US);
Guihua Zhang, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 516 days.

(21) Appl. No.: 12/454,087

(22) Filed: May 12, 2009

(65) Prior Publication Data
US 2010/0292966 A1 Nov. 18, 2010

(51) Int. Cl.
*G06F 17/10* (2006.01)
(52) U.S. Cl. ............. 703/2; 703/6; 703/7; 700/145; 700/146; 700/150; 700/153
(58) Field of Classification Search ............ 703/2, 7, 703/6
See application file for complete search history.

(56) References Cited

U.S. PATENT DOCUMENTS

| | | | | |
|---|---|---|---|---|
| 4,790,172 | A * | 12/1988 | Simensen et al. | 72/368 |
| 5,421,397 | A * | 6/1995 | Hembree et al. | 164/457 |
| 5,669,436 | A * | 9/1997 | Papich et al. | 164/461 |
| 5,930,155 | A * | 7/1999 | Tohi et al. | 703/8 |
| 2003/0060999 | A1* | 3/2003 | Ogino et al. | 702/136 |
| 2006/0064288 | A1* | 3/2006 | Ferryanto et al. | 703/2 |
| 2008/0015827 | A1* | 1/2008 | Tryon et al. | 703/2 |
| 2008/0249743 | A1* | 10/2008 | Hirohata et al. | 702/181 |
| 2009/0301617 | A1* | 12/2009 | Doty | 148/698 |
| 2010/0023903 | A1* | 1/2010 | Pramono et al. | 716/5 |
| 2010/0078254 | A1* | 4/2010 | Rolfe et al. | 180/302 |
| 2010/0087942 | A1* | 4/2010 | Sims, Jr. | 700/103 |
| 2010/0101691 | A1* | 4/2010 | Doty | 148/698 |
| 2010/0174515 | A1* | 7/2010 | Madhavan et al. | 703/2 |
| 2010/0185312 | A1* | 7/2010 | Wang et al. | 700/104 |
| 2010/0280800 | A1* | 11/2010 | Yilbas et al. | 703/2 |
| 2010/0305910 | A1* | 12/2010 | Yilbas et al. | 703/2 |
| 2011/0098989 | A1* | 4/2011 | Wang et al. | 703/2 |
| 2011/0144788 | A1* | 6/2011 | Wang et al. | 700/104 |

OTHER PUBLICATIONS i B. G. Thomas, M. Bellet, "Modeling of Stress, Distortion and Hot Tearing", pp. 449-461, 2008.*
A. G. Delgado, "A Study of Casting Distortion and Residual Stress in Die Casting", pp. 1-285, Dissertation 2007.*
A. E. Ragab, "Sensitivity Analysis of Casting Distortion and Residual Stress Prediction through Simulation Modeling and Experimental Verification", pp. 1-215, Dissertation 2003.*

* cited by examiner

*Primary Examiner* — Kamini S Shah
*Assistant Examiner* — Kibrom Gebresilassie
(74) *Attorney, Agent, or Firm* — Dinsmore & Shohl LLP

(57) ABSTRACT

Computational systems, methods, and articles of manufacture to predict at least one of residual stresses and distortion in quenched aluminum castings. Residual stresses and distortion may be predicted through incorporating thermal strains induced during quenching with the nonlinear constitutive behavior of quenched microstructures of a quenched aluminum casting, wherein thermal strains arise generally from non-uniform transient temperature distribution of the casting during quenching. The transient temperature distribution of the aluminum casting during quenching may be calculated based on heat transfer coefficients specific to one or more nodes, elements and/or zones on the surfaces of the aluminum casting. The nonlinear constitutive behavior of the quenched aluminum casting may be modeled as functions of temperatures, strain rates, and microstructure variations. A material constitutive model accounts for not only strain hardening and creep, but also precipitate hardening. Thereby, residual stresses and distortion in the quenched aluminum castings can be predicted using the embodiments.

28 Claims, 16 Drawing Sheets
(5 of 16 Drawing Sheet(s) Filed in Color)

METHODS OF PREDICTING RESIDUAL STRESSES AND DISTORTION IN QUENCHED ALUMINUM CASTINGS

BACKGROUND

The present invention relates generally to residual stress and distortion induced in aluminum alloys, including aluminum alloy castings, during a quenching/cooling process. More particularly, the invention relates to systems, methods, and articles of manufacture to predict residual stresses and distortion in quenched aluminum castings after solution treatment.

Residual stresses are defined generally as stresses that remain in a product/component/object after manufacture processing. The residual stresses may be present in engineered castings, thin films, surface coatings, composites, and multiphase materials. Residual stresses may originate from a variety of sources. For example, macroscopic residual stresses may arise from heat treatment, machining, secondary thermal and mechanical processing, and assembling procedures, whereas micro-structural residual stresses often result from thermal expansion/contraction mismatch between phases and constituents, or from phase transformations. Manufacture components, such as aluminum castings, generally comprise some determinable level of residual stresses.

Aluminum castings often are subjected to a T6/T7 heat treatment to increase their mechanical properties. T6/T7 heat treatment generally includes a solution treatment at a relatively high temperature, followed by a quick quench in a cold or cool quench media, such as water or forced air, then age hardened at an intermediate temperature. Significant residual stresses and distortion may arise in aluminum castings, particularly those having complex geometric structures, due to what is typically a high non-uniformity of temperature distribution in the aluminum castings during quenching processes and particularly during rapid quenching, for instance in water. The presence of residual stresses and/or distortion in a structural component, such as an aluminum casting, can significantly and negatively influence the component's dimensional tolerance and performance. With increasing demand to reduce weight and improve fuel efficiency of automobiles, aluminum castings are being more widely used for critical automotive components, such as engine blocks, cylinder heads, and suspension parts. Such aluminum castings are often subjected to cyclic loading. Fatigue performance of aluminum castings may be significantly and negatively affected by the presence of residual stresses and, in particular, by tensile residual stresses in surface layers around the fillets area of the aluminum castings.

There are many ways to measure residual stresses in manufactured components, including those configured of aluminum alloys. Mechanical techniques such as hole drilling, curvature measurements, and crack compliance methods measure residual stresses in components based on respective component distortion. Diffraction techniques, such as electron, X-ray, and neutron, measure elastic strains in components due to residual stresses. Other techniques, including magnetic, ultrasonic, piezospectroscopy, photoelasticity, and thermoelastic, also are being developed. Mechanical techniques, however, generally are destructive of the component, while the accuracy of diffraction and other non-destructive techniques in measuring residual stresses generally depends on the extent of microstructure variation and geometric complexity of the component structure. In addition, it is generally impracticable to measure residual stresses in every location of a component not only because of the geometric constrains, but also because of the required time and cost to do so. As such, based on the foregoing, there exists a need for systems, methods, and articles of manufacture to accurately and computationally predict residual stresses and/or distortion of quenched aluminum castings.

SUMMARY

It is against the above background that embodiments of the present invention generally relate to systems, methods, and articles of manufacture to predict residual stresses and/or distortion of quenched aluminum castings. As used herein, "aluminum casting" refers generally to any cast component, part, or other article of manufacture configured substantially of aluminum and/or any one or more aluminum alloys. Further, as used herein, "quenched" refers generally to an aluminum alloy quenched or cooled in accordance with any conventional or yet to be developed quenching processes, while, as used herein, "water quenching" refers generally to any conventional or yet to be developed quenching processes using a water quench media.

More particularly, according to the embodiments, computational systems, methods, and articles of manufacture predict residual stresses and distortion in quenched aluminum castings after solution treatment. Residual stresses and distortion are predicted through incorporating thermal strains induced in a quench process with the nonlinear constitutive behavior of quenched microstructures of a quenched aluminum casting, wherein the thermal strains arise generally from non-uniform transient temperature distribution of the casting during quenching. The transient temperature distribution of the aluminum casting during quenching is calculated based on heat transfer coefficients specific to one or more nodes, elements, and/or zones on the surfaces of the aluminum casting. The nonlinear constitutive behavior of the quenched aluminum casting is modeled as functions of temperatures, strain rates, and microstructure variations. A material constitutive model accounts for not only strain hardening and creep, but also precipitate hardening. With the embodiments, residual stresses and distortion in a quenched aluminum casting can be predicted with a high accuracy.

In accordance with one embodiment, a system to predict at least one of residual stress and distortion of an aluminum casting comprises an information input, an information output, a processing unit, and a computer-readable medium. The information input is configured to receive information relating to at least one of material microstructure characteristics, at least one of material thermophysical and mechanical properties, and at least one of a plurality of nodes, elements, and/or zones of the aluminum casting during quenching thereof, while the information output is configured to convey information relating to at least one of the residual stresses and distortion present in the aluminum casting predicted by the system. The computer-readable medium comprises a computer-readable program code embodied therein. The computer-readable medium is cooperative with the processing unit, the information input, and the information output such that the received information is operated upon by the processing unit and computer-readable program code to be presented to the information output as a prediction of at least one of the residual stress and distortion of the aluminum casting. The computer readable program code comprises a simulation module, a heat transfer module, a strain and stress analysis module, and a user material subroutine module defining a material constitutive model, The simulation module simulates quenching process of a virtual aluminum casting replicative of the aluminum casting and the quenching thereof, the virtual aluminum casting comprising a plurality of virtual surface nodes, elements and/or zones correlated with the surfaces of the aluminum casting and a plurality of virtual nodes, dimensional elements, and zones that form the body structure of the aluminum casting. The heat transfer module calculates a plurality of heat transfer coefficients specific to the respective virtual surface nodes, elements, and/or zones and calculates a plurality of virtual node-specific, element-specific, and/or zone-specific temperatures using the heat transfer coefficients, the virtual node-specific, element-specific, and/or zone-specific temperatures respectively specific to a time of the simulated quenching. The strain and stress analysis module calculates a total strain of at least a node, an element, and/or a zone in the aluminum casting using the virtual node-specific, element-specific, and/or zone-specific temperatures and a coefficient of thermal expansion/contraction. The strain and stress analysis module also calculates a plurality of thermal stresses and strains at integration points defining the dimensional elements of the respective virtual aluminum casting and calculates a strain rate and a change in strain at the respective integration points. The material constitutive model defined in the user material subroutine module which is in communication with strain and stress analysis module calculates at least one of a residual stress and distortion at the respective integration points to predict at least one residual stress and distortion of the aluminum casting.

Optionally, the computer-readable medium may comprise a finite element analysis module comprising at least one of the simulation module, the heat transfer module, the strain and stress analysis module, and at least one of the user material subroutine modules defining a material constitutive model and is cooperatively coupled with any of the simulation module, the heat transfer module, the strain and stress analysis module, and at least one of the user material subroutine modules defining a material constitutive model not comprised by the finite element analysis module. The received information received by the information input may comprise information relating to at least one of the transient temperature distributions of at least one of the nodes, elements, and/or zones of the aluminum casting during quenching thereof and at least one of a plurality of material properties of at least one of the nodes, elements, and/or zones of the aluminum casting during quenching. The material properties of the aluminum casting may comprise microstructure characteristics and thermo-physical and mechanical properties that comprise at least a secondary dendrite arm spacing (SDAS) of the aluminum casting.

Further, optionally, the virtual surface zones of the virtual aluminum casting may comprise at least one top surface of the virtual aluminum casting and at least one bottom surface of the virtual aluminum casting respective to quench orientation of the aluminum casting. The virtual surface zones may respectively comprise a plurality of nodes and dimensional elements on the surfaces respectively defined by a length (x), a width (y), and a depth (z). The heat transfer coefficients may be calculated using an equation expressed as:

$$h_{tc(x,y,z)} = f(v, T_{qm}, t, \ldots)$$

where $h_{tc(x,y,z)}$ is one of the heat transfer coefficients specific to one of the dimensional nodes and elements defined by length (x), width (y), and depth (z), v is a velocity of a quench media utilized during the simulated quenching, $T_{qm}$ is a temperature of the quench media at a time during the simulated quenching, and t is a time of the simulated quenching at which the heat transfer coefficient is calculated. The dimensional elements may respectively comprise a second-order tetrahedron element. The heat transfer module may optimize the virtual surface node-specific, element-specific, and/or zone-specific heat transfer coefficients by minimizing differences between virtual temperatures calculated during the simulated quenching by at least one corresponding thermocouple location and experimental temperatures measured during the quenching by at least one thermocouple. The differences between the virtual temperatures and the experimental temperatures may be minimized by adjusting surface node-specific, element-specific, and/or zone-specific heat transfer coefficients and a length of time interval during the simulated quenching. The differences between the virtual temperatures and the experimental temperatures may be determined using an equation expressed as:

$$\text{Error} = \sum_{i=1}^{N} \sqrt{\sum_{j=1}^{M} (T_{i,j}^{calc} - T_{i,j}^{expt})^2}$$

where $T_{i,j}^{calc}$ is a temperature of the virtual aluminum casting calculated at a time step j of the simulated quenching at thermocouple i, $T_{i,j}^{expt}$ is a temperature of the aluminum casting measured at a time step j of quenching at thermocouple i, M is a total number of comparisons made for a specific thermocouple, and N is a total number of thermocouples. In addition, the virtual node-specific, element-specific, and/or zone-specific temperatures in the aluminum casting may be expressed as:

$$T_{(x,y,z)} = f(h_{tc}, K, t)$$

where T(x,y,z) refers to the temperature of a specific virtual node, element, and/or zone, $h_{tc}$ refers to the virtual surface node-specific, element-specific, and/or zone-specific heat transfer coefficient, K refers to thermal conductivity, and t refers to the time during the quenching at which the heat transfer coefficient was calculated.

Further, optionally, the total strain may be determined from intrinsic strength $\hat{\sigma}_e$, strain hardening $\hat{\sigma}_p$, and precipitate hardening $\hat{\sigma}_{ppt}$, and may be expressed as:

$$\frac{\sigma}{\mu(T)} = C_e(\dot{\varepsilon}, T)\frac{\hat{\sigma}_e}{\mu_0} + C_p(\dot{\varepsilon}, T)\frac{\hat{\sigma}_p}{\mu_0} + C_{ppt}(\dot{\varepsilon}, T)\frac{\hat{\sigma}_{ppt}}{\mu_0}$$

where $C_e(\dot{\varepsilon}, T)$, $C_p(\dot{\varepsilon}, T)$, and $C_{ppt}(\dot{\varepsilon}, T)$ are velocity-modified temperatures for intrinsic strength, strain hardening, and precipitate hardening, respectively; T is the temperature measured in Kelvin and $\dot{\varepsilon}$ is the strain rate; $\mu_0$ (=28.815 GPa) is a reference shear modulus value at 0 K and $\dot{\varepsilon} = 10^7$ s$^{-1}$ for the aluminum casting; and $\mu(T)$ is a temperature-dependent shear modulus. After yield, flow stress may be modeled through evolution of $\hat{\sigma}_p$ and $\hat{\sigma}_{ppt}$ where strain hardening is expressed as:

$$\hat{\sigma}_p = \hat{\sigma}'_p + \frac{\mu(T)}{\mu_0}\theta_0\left[1 - \frac{\hat{\sigma}'_p}{\hat{\sigma}_{os}}\right]d\varepsilon$$

where $\theta_0$ represents the slope of the stress-strain curve at yield in the reference state (0 K, $\dot{\varepsilon} = 10^7$ s$^{-1}$) and $\hat{\sigma}_{os}$ is a parameter of one of the material properties. Further, after yield, precipitate hardening may be expressed as:

$$\dot{\sigma}_{ppt} = \frac{M}{b} \frac{\int_0^\infty f(r_{eq}) F(r_{eq}) dr_{eq}}{\int_0^\infty f(l) dl}$$

where M is the Taylor factor; b is the Burgers vector; $r_{eq}$ and l are precipitate equivalent circle radius ($r_{eq}=0.5\ d_{eq}$) and spacing on the dislocation line, respectively; $f(r_{eq})$ is a precipitate size distribution; $f(l)$ is a particle spacing distribution; and $F(r_{eq})$ is an obstacle strength of a precipitate of radius $r_{eq}$. The change in strain at the respective integration points may be calculated from differences in the time-specific, virtual node-specific, element-specific, and/or zone-specific temperatures and a geometric structure of the respective virtual nodes, elements, and/or zones with an assumption of zero plastic strains, where the change in strain may be expressed as:

$$d\bar{\varepsilon} = \frac{\sqrt{2}}{3} \sqrt{\begin{array}{c}(d\varepsilon_{11}-d\varepsilon_{22})^2 + (d\varepsilon_{11}-d\varepsilon_{33})^2 + \\ (d\varepsilon_{22}-d\varepsilon_{33})^2 + 6*d\varepsilon_{12}^2 + 6*d\varepsilon_{23}^2 + 6*d\varepsilon_{13}^2\end{array}}.$$

The strain rate may be calculated based on the change in strain at the respective integration points and is expressed as:

$$\dot{\varepsilon} = \frac{d\bar{\varepsilon}}{dt}$$

where $d\epsilon_{ij}$ (i=1, 2, 3; j=1, 2, 3) is one of six components of changes in strain at the respective integration points, and dt is a time increment separating consecutive time-specific, virtual node-specific, element-specific, and/or zone-specific temperatures.

Further, optionally, the strain and stress analysis module may calculate a plurality of thermal stresses and strains at the respective integration points by calculating trial elasticity, flow stress, and plastic flow, by obtaining equivalent plastic strains and hardening rates and a Jacobian Matrix for plasticity, and by calculating plasticity. The strain and stress analysis module may calculate the trial elastic stress using fully elastic strains provided by the system, where the trial elastic stress is expressed as:

$$\delta_{ij} = \lambda \delta_{ij} \epsilon^{el}_{kk} + 2\mu \epsilon^{el}_{kk}$$

where $\epsilon^{el}_{kk}$ is the driving variable calculated from a change in temperature and a geometric structure of the virtual aluminum casting. The strain and stress analysis module may calculate the Von Mises stress based on purely elastic behavior and expressed as:

$$\bar{\sigma} = \sqrt{\frac{1}{2}((\sigma_{11}-\sigma_{22})^2 + (\sigma_{11}-\sigma_{33})^2 + (\sigma_{22}-\sigma_{33})^2 + 6*\sigma_{12}^2 + 6*\sigma_{23}^2 + 6*\sigma_{13}^2)}$$

$$\sqrt{\frac{3}{2} S_{ij} S_{ij}} = \sqrt{\frac{3}{2}((S_{11})^2 + (S_{33})^2 + (S_{22})^2 + 2*S_{12}^2 + 2*S_{23}^2 + 2*S_{13}^2)}$$

where $S_{ij} = \sigma_{ij} - \frac{1}{3}\delta_{ij}\sigma_{kk}$.

The user material subroutine module defining the material constitutive model may determine whether a predicted elastic stress is larger than the yield stress so that plastic flow occurs, where the predicted elastic stress may be expressed as:

$$\varepsilon^{pl}_{ij} = \frac{3 S_{ij}}{2\sigma_y} \dot{\bar{\varepsilon}}^{pl}.$$

The user material subroutine module may use a backward Euler method to integrate equations for a calculation of actual plastic strain:

$$\bar{\sigma}^{pr} - 3\mu\Delta\bar{\varepsilon}^{pl} = \sigma_y(\bar{\varepsilon}^{pl}).$$

The user material subroutine module also may calculate updated thermal stresses and strains, where:

$$\sigma_{ij} = \eta_{ij}\sigma_y + \frac{1}{3}\delta_{ij}\sigma^{pr}_{kk}$$

$$\Delta\varepsilon^{pl}_{ij} = \frac{3}{2}\eta_{ij}\Delta\bar{\varepsilon}^{pl}$$

$$\eta_{ij} = \frac{S^{pr}_{ij}}{\bar{\sigma}^{pr}}.$$

Further, the user material subroutine module may calculate a Jacobian Matrix at the respective integration points to solve respective plasticity, where:

$$\Delta\sigma_{ij} = \lambda^* \delta_{ij} \Delta\varepsilon_{kk} + 2\mu^* \Delta\varepsilon_{ij} + \left(\frac{h}{1+h/3\mu} - 3\mu^*\right)\eta_{ij}\eta_{kl}\Delta\varepsilon_{kl}$$

where $$\mu^* = \mu\sigma_y/\bar{\sigma}^{pr},$$

$$\lambda^* = k - \frac{2}{3}\mu^*,$$

and $$h = d\sigma_y/d\bar{\varepsilon}^{pl}.$$

Further, optionally, the residual stress calculated by the material constitutive model may be expressed as:

$$\sigma_r = f(\Delta\epsilon, T, \dot{\epsilon}, SDAS).$$

In accordance with another embodiment, a method of predicting at least one of residual stresses and distortion of an aluminum casting comprises: providing a virtual aluminum casting, the virtual aluminum casting comprising at least one of a plurality of nodes, elements and/or zones and has been quenched via a quenching process; simulating a quenching of a virtual aluminum casting replicative of the aluminum casting and the quenching thereof, wherein the virtual aluminum casting comprises a plurality of virtual surface nodes, elements, and/or zones and a plurality of dimensional nodes, elements and/or zones that form the body geometric structure of the virtual aluminum casting; calculating a plurality of heat transfer coefficients specific to the respective virtual surface nodes, elements, and/or zones; calculating a plurality of virtual node-specific, element-specific, and/or zone-specific temperatures using the surface node-specific, element-specific, and/or zone-specific heat transfer coefficients, the virtual node-specific, element-specific, and/or zone-specific temperatures respectively specific to a time of the simulated quenching; calculating a total strain of the respective virtual nodes, elements, and/or zones using the virtual node-specific, element-specific, and/or zone-specific temperatures and a coefficient of thermal expansion/contraction; calculating a plurality of thermal stresses and strains at integration points defining the dimensional elements and/or zones of the respective virtual aluminum casting; calculating a strain rate and a change in strain at the respective integration points; calculating at least one of a residual stress and distortion at the respective integration points; and predicting at least one residual stress and distortion of the aluminum casting.

In accordance with yet another embodiment, an article of manufacture to predict at least one of a residual stress and distortion of an aluminum casting comprises an information input, an information output, and at least one computer useable medium. The information input is configured to receive information relating to at least one of a plurality of at least one of nodes, elements, and zones of the aluminum casting during a quenching thereof, while the information output is configured to convey information relating to at least one of the residual stress and distortion of the aluminum casting predicted by the article of manufacture. The computer useable medium comprises computer-readable program code means embodied therein for simulating a quenching of a virtual aluminum casting replicative of the aluminum casting and the quenching thereof, the virtual aluminum casting comprising at least one of a plurality of virtual surface nodes, elements, and zones correlated with at least one of the nodes, elements, and zones of the aluminum casting and the virtual surface zones respectively comprising a plurality of dimensional elements and virtual dimensional elements respectively comprising a plurality of nodes. In addition, the computer useable medium comprises computer-readable program code means embodied therein for calculating a plurality of heat transfer coefficients specific to the respective virtual surface nodes, elements, and zones. Also, the computer useable medium comprises computer-readable program code means embodied therein for calculating a plurality of at least one of virtual node-specific, element-specific, and zone-specific temperatures using the heat transfer coefficients, the virtual node-specific, element-specific, and zone-specific temperatures respectively specific to a time of the simulated quenching. Further, the computer useable medium comprises computer-readable program code means embodied therein for calculating a total strain of the respective virtual nodes, elements, and/or zones to define at least one of a virtual node-specific, element-specific, and/or zone-specific stress-strain curve using the virtual node-specific, element-specific, and/or zone-specific temperatures and a coefficient of thermal expansion/contraction. Additionally, the computer useable medium comprises computer-readable program code means embodied therein for calculating a plurality of thermal stresses and strains at integration points defining the dimensional elements of the respective virtual zones. The computer useable medium comprises computer-readable program code means embodied therein for calculating a strain rate and a change in strain at the respective integration points. Further, the computer useable medium comprises computer-readable program code means embodied therein for calculating at least one of a residual stress and distortion at the respective integration points to predict at least one residual stress and distortion of the aluminum casting. Also, the computer useable medium is cooperative with the information input and the information output such that the received information is operated upon by the computer-readable program code means to be presented to the information output as a prediction of at least one of the residual stress and distortion of the aluminum casting.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following detailed description of specific embodiments can be best understood when read in conjunction with the following drawings, where like structure is indicated with like reference numerals and in which.

Figure 1A:
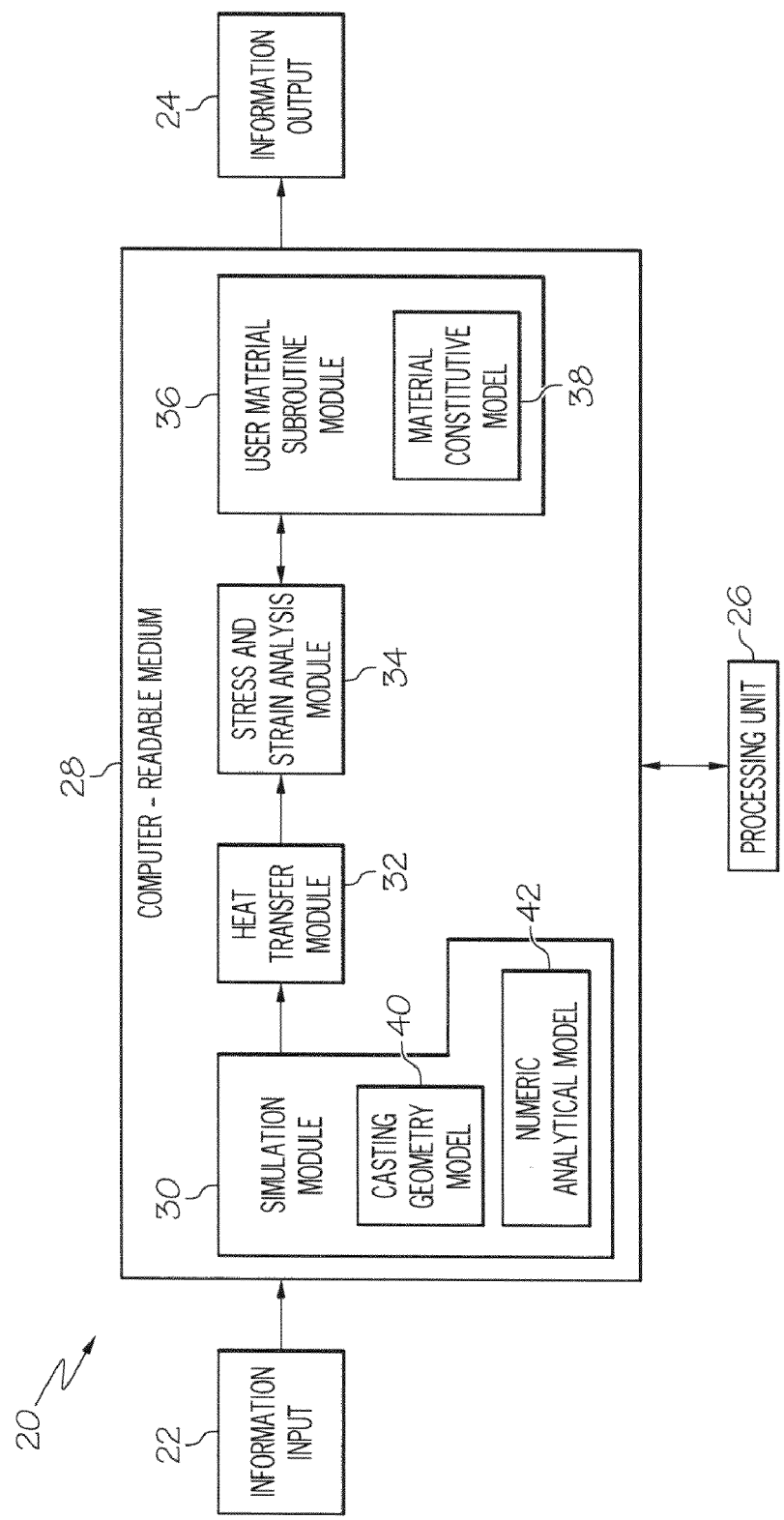
FIG. 1A illustrates a system to predict a residual stress of an aluminum casting according to one embodiment of the present invention.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION

As mentioned above, embodiments of the present invention relate generally to systems, methods, and articles of manufacture to predict residual stresses and/or distortion in quenched aluminum castings. In quenching, the induced residual stresses and distortion in aluminum castings generally are due to differences in cooling rates and, thus, temperatures and thermal contraction rates from location to location of the aluminum casting geometric structure. In accordance with embodiments, a strain and stress analysis module predicts at least one of residual stresses and distortion in quenched aluminum castings. Using a strain and stress analysis, the residual stresses and distortion may be predicted through incorporating thermal strains induced in the quenching with a nonlinear constitutive behavior of as-quenched microstructures of aluminum castings, the thermal strains generally arising from non-uniform transient temperature distributions across the up to entire sections of an aluminum casting during quenching. The transient temperature distribution of aluminum castings during quenching may be calculated based on surface node-specific, element-specific, and/or zone-specific heat transfer coefficients ($h_{tc}$). For an aluminum casting having a complex geometric structure, such as a cylinder head, the heat transfer boundary, e.g., the exterior surface, of the entire casting may be divided into a plurality of nodes, elements, and/or zones based on the nature and similarity of the quench conditions. The temperature-dependant, surface node-specific, element-specific, and/or zone-specific heat transfer coefficients may then be inversely calculated from the actual measurements of temperature distributions. The non-linear constitutive behavior of the quenched aluminum castings may be modeled through material constitutive models as functions of temperatures, strain rates, and microstructure variations. With the embodiments, the residual stresses and/or distortion in the quenched aluminum castings can be predicted with high accuracy.

With the embodiments, data representing an aluminum casting is provided to a thermal analysis module. More particularly, thermal analyses are performed to predict temperature-time profiles using heat transfer coefficients obtained from the quenching experiments of aluminum castings. Material constitutive models, derived from materials' nonlinear viscoplastic behavior and validated with experimental measurements, are in communication with the strain and stress analysis module to predict residual stresses and/or distortion of aluminum castings. Using the material constitutive model in strain and stress analysis, accurate residual stresses and/or distortion can be predicted and, thereby, material and quenching parameters for aluminum castings can be optimized to minimize residual stresses and/or distortion thereof.

Data representing the aluminum casting is provided to enable predictions of residual stresses and/or distortion of an aluminum casting determined through simulation and computation by the embodiments. As such, an aluminum casting is provided having a defined geometric structure, composition, and material properties. The exterior surface of the geometric structure of the aluminum casting may be divided into a plurality of nodes, elements, and/or zones that may be affected differently by a quenching process thereof. For example, the zones may comprise a top surface, a bottom surface, and a side surface of the aluminum casting. The material properties may include microstructure characteristics and/or physical, thermophysical, and mechanical properties, such as, but not limited to, secondary dendrite arm spacing (SDAS) of the aluminum casting.

Aluminum castings may be quenched in cool water for a high cooling rate so as to enhance the material properties of the casting through quenching. For example, significant precipitation hardening generally requires a high cooling rate after solution heat treatment. On the other hand, it may be desirable to have a low cooling rate of the castings to reduce distortion and formation of residual stresses. Heat transfer coefficients between the castings and the quench media may affect quenching results, such as distortion, residual stress, and hardness distribution. As such, the determination of heat transfer coefficients for casting surfaces during quenching may assist in the prediction of residual stresses and/or distortion.

The residual stresses and distortion originating in castings through quenching may be a function of transient temperature distribution, a coefficient of thermal expansion/contraction (CTE), and material properties of quenched microstructure, as defined in the equation below, as well as various variables including casting geometry, casting surface quality, quench media, and quench orientation, etc.

$$\sigma_{Residual} = f(CTE, \text{Temp}, \text{Materials Properties})$$

For certain material properties, residual stresses and distortion may be directly proportional to the temperature differences between zones, dimensional elements, and/or nodes of a casting. In fact, the temperature differential at any given time during quenching is what generally induces the residual stresses and distortion. The temperature distribution of an aluminum casting during quenching is generally dependent upon the interfacial heat transfer coefficients between the casting and the quench media. While the interfacial heat transfer coefficients and the temperature distributions of the virtual aluminum casting may be determined using computational fluid dynamics (CFD), it is difficult to accurately capture the physics and calculate correct nodal-based interfacial heat transfer coefficients and thus the temperature distributions in CFD, particularly for rapid water quenching.

Figure 2A:
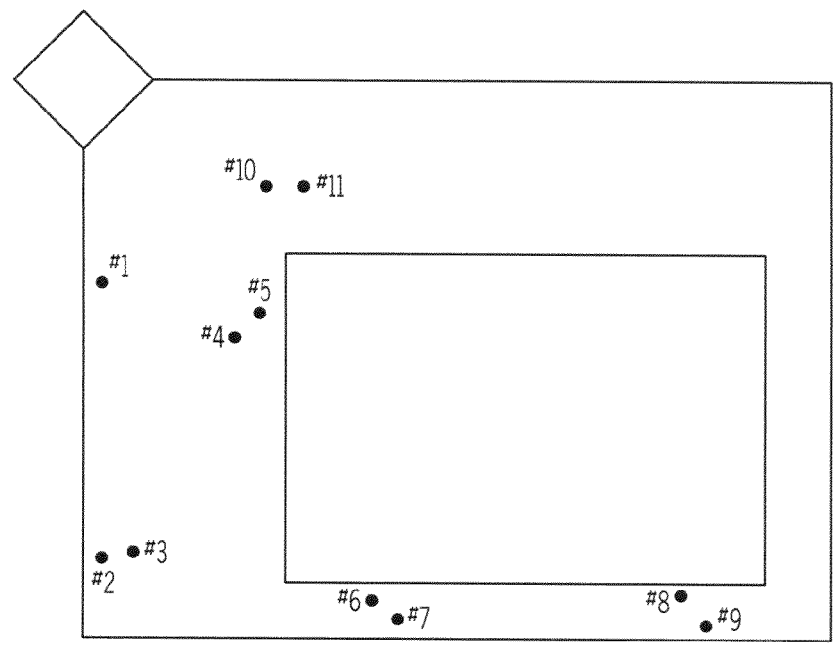
FIG. 2A illustrates a cross-sectional view of an aluminum casting having a plurality of thermocouples of which a residual stress is predicted according to another embodiment of the present invention.

Thus, to experimentally and computationally determine the interfacial heat transfer coefficients, an aluminum casting should be quenched in quench media under known conditions, including a temperature of the quench media, a flow rate of the quench media, a rate of introduction of the part into the quench media, an orientation of the casting during immersion and quenching, etc. To study how aluminum castings behave during quenching, a casting is quenched and monitored to observe changes in temperature and/or in material properties. Also, the effect of the orientation of casting surfaces in the quench media can be studied, so that in real production, different heat transfer coefficient values for different casting surfaces can be considered. Thermocouples may be casted into the casting so that tight and firm connections can be ensured for accurate temperature measurements. These thermocouples are placed at different locations of the casting, as shown in FIG. 2A, to measure temperatures with respect to different surfaces.

Figure 2B:
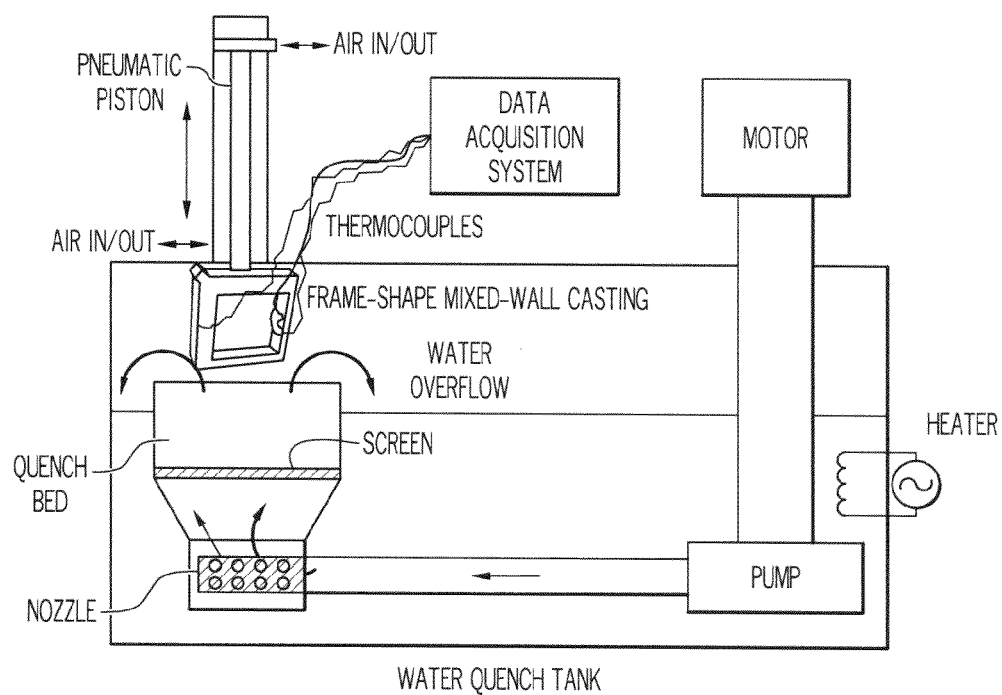
FIG. 2B illustrates a water quench experimental set-up for water quenching the aluminum casting of FIG. 2A according to another embodiment of the present invention.
Figure 4:
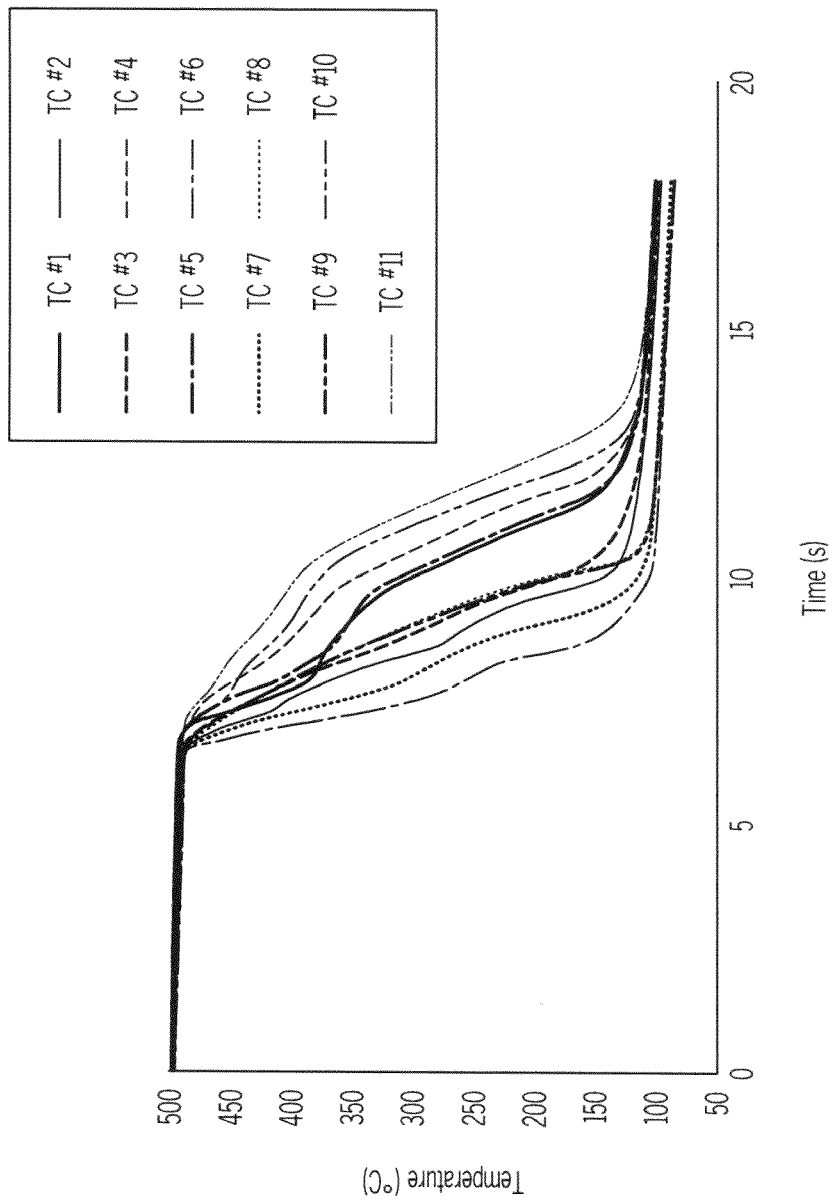
FIG. 4 graphically illustrates time-temperature curves of the thermocouples of the aluminum casting illustrated in FIG. 2A.

For liquid quench such as water quench, a quenching bed at least partially filled with a quench media (such as water) may be used to quench the casting, as shown in FIG. 2B. Generally, the casting is heated in a furnace and held for a certain time in the furnace to attain a uniform specified temperature. When quenching, the hot casting is quickly taken out from the furnace and fixed to a lifting system within 15 seconds. The lifting system may be driven by electric motors, mechanic mechanisms, or pneumatic system. The lifting system then lowers the casting, usually at a constant speed, to immersion in the quench media. The immersion velocity can be adjusted through the lifting system, such as pneumatic system shown in FIG. 2B. For experiments in determining the agitation effects of the quench media, the quench media may be pumped and circulated. For example, in water quench bed shown in FIG. 2B, the water may be circulated through an electric pump. The water flow rate and velocity may be adjusted by varying electric voltage applied to the electric motor or through a flow rate regulator. The quench media flow velocity at a location in the quenching bed where a casting is quenched may be 0.08 meters per second and the media is heated to a high temperature to simulate production conditions. Otherwise, the quench media may be relatively still by turning off the electric pump with an exception of the immersion of the casting into the media. To ensure the uniform water flow velocity in the quench bed, a nozzle with a plurality of small holes geometrically optimized using CFD and/or experimental trials may be connected to water pump line and placed at the bottom of the quench bed. At the intermediate height of the quench bed, one and/or multiple layers of screens may be placed to further enhance uniform water flow. After the casting is cooled to a desirable temperature, such as that of the quench media, the casting is removed from the quenching bed by the lifting system. During this process, the temperatures of the casting at specific locations and/or zones may be measured and saved. Temperature-time curves at the different locations and/or zones may be plotted after the casting has been removed from the quenching bed. For example, temperature-time curves for the picture-frame casting illustrated in FIGS. 2A and 2B are plotted in FIG. 4. It is apparent that the temperature-time curves from the thick walls of the picture-frame casting are different from those from the thin walls of the casting. Thereafter, node-specific, element-specific, and/or zone-specific heat transfer coefficients may be iteratively determined from the respective temperature-time curves.

Information relating to the geometric structure, composition, and material properties, including microstructure characteristics and thermophysical and mechanical properties, of the aluminum casting are provided to the embodiments. In addition, information relating to defined surface nodes, elements, and/or zones of the castings and the quenching thereof, such as transient temperature distributions of the nodes, elements, and/or zones during quenching, are provided to the embodiments as well. This information is provided to the embodiments for comparison and computational purposes, as is described in greater detail herein.

Figure 1B:
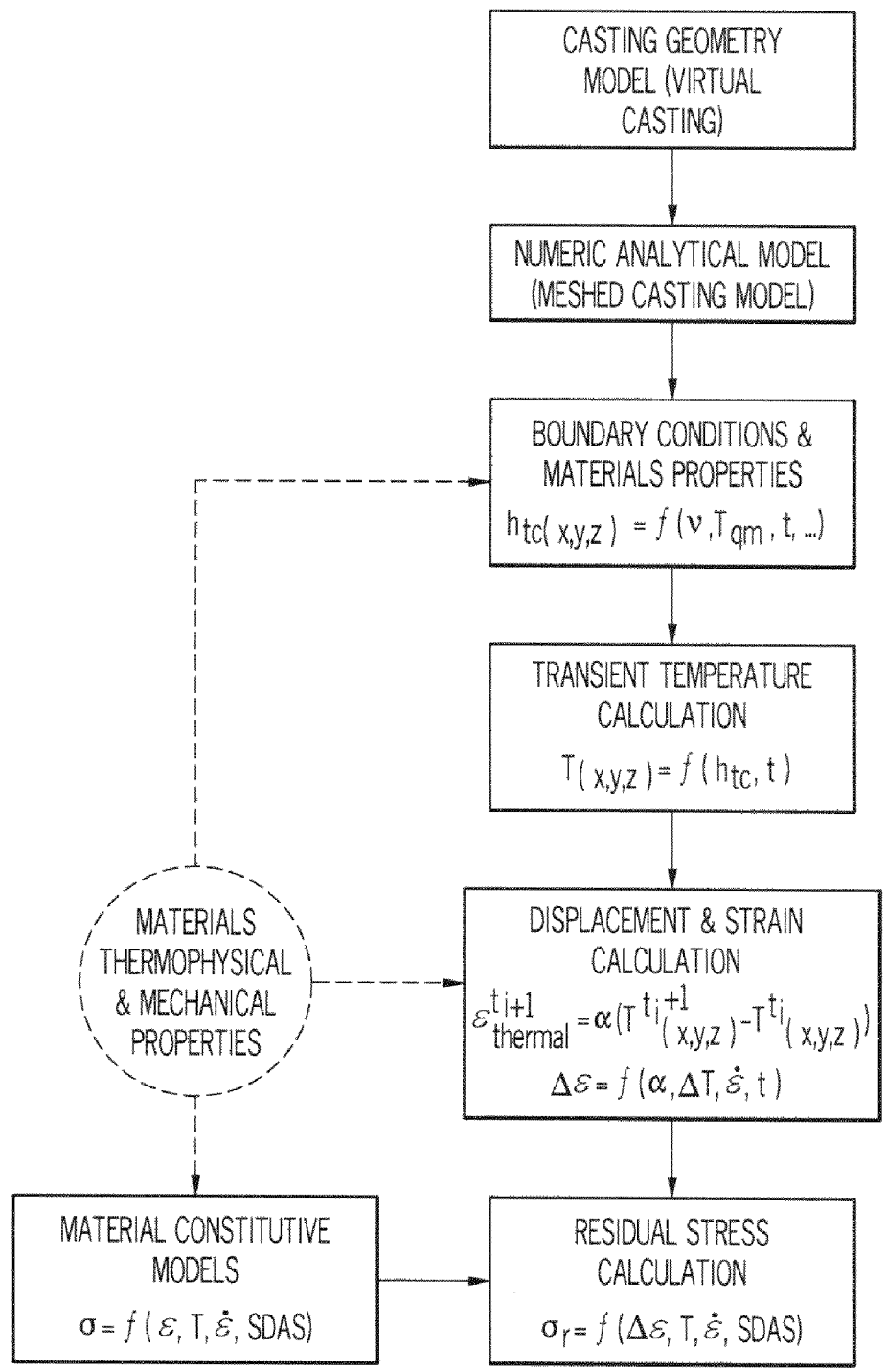
FIG. 1B illustrates a flow chart to predict a residual stress of an aluminum casting according to another embodiment of the present invention.

In one embodiment, shown in FIG. 1A, a system 20, utilizing the flow chart shown in FIG. 1B, for example, may predict a residual stress and distortion of an aluminum casting. The system 20 comprises an information input 22, an information output 24, a processing unit 26, and a computer-readable medium 28. The information input is configured to receive the information relating to the aluminum casting, while the information output is configured to convey information relating to the residual stress and distortion of the aluminum casting predicted by the system. The computer-readable medium 28 comprises a computer readable program code embodied therein, the computer readable program code comprising a simulation module 30, a heat transfer module 32, a strain and stress analysis module 34, and a user material subroutine module 36 defining a material constitutive model 38. Further, the computer-readable medium may comprise a finite element analysis module. The finite element analysis module may comprise at least one of the simulation module, the heat transfer module, the strain and stress analysis module, and material constitutive model defined in the user material subroutine module, and be cooperatively coupled with any of the simulation module, the heat transfer module, the strain and stress analysis module, and material constitutive model defined in the user material subroutine module. The processing unit 26 is in communication with, and processes the calculations and other data of, the computer-readable medium 28 to predict the residual stresses and distortion of an aluminum casting.

It is contemplated that the system, such as the simulation module 30 thereof, may comprise computer-aided design (CAD) capabilities sufficient to create a virtual aluminum casting, such as a casting geometry model 40. In addition thereto or in the alternative thereof, the simulation module, or other component of the system, may be configured to receive a created virtual aluminum casting for simulation purposes as described herein. The virtual casting is replicated from the geometric structure, composition, and material properties of a specific aluminum casting. As such, the virtual casting comprises a plurality of virtual surface nodes, elements, and/or zones correlated with the different nodes, elements, and/or zones of the aluminum casting. The virtual surface nodes, elements, and/or zones, for example, may comprise a top surface of the virtual aluminum casting and a bottom surface of the virtual aluminum casting, wherein the top and bottom surfaces respectively correlate with nodes, elements, and/or zones in the virtual casting comprising top and bottom surfaces of the aluminum casting, and the top and bottom surfaces are relative to quenching orientation.

Figure 8A:
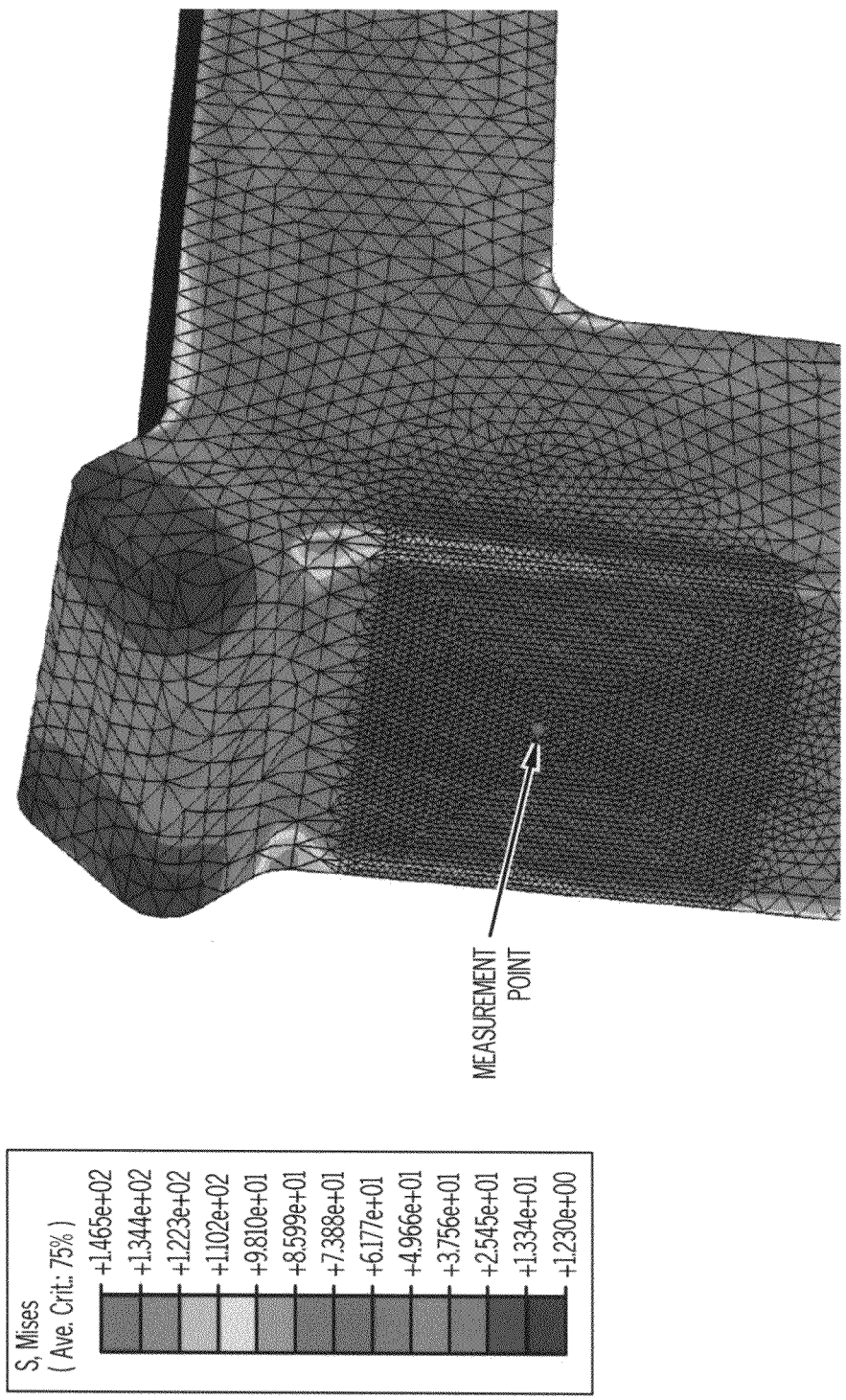
FIG. 8A illustrates a zone of a thick portion of an aluminum casting of which a residual stress is predicted according to another embodiment of the present invention.
Figure 8B:
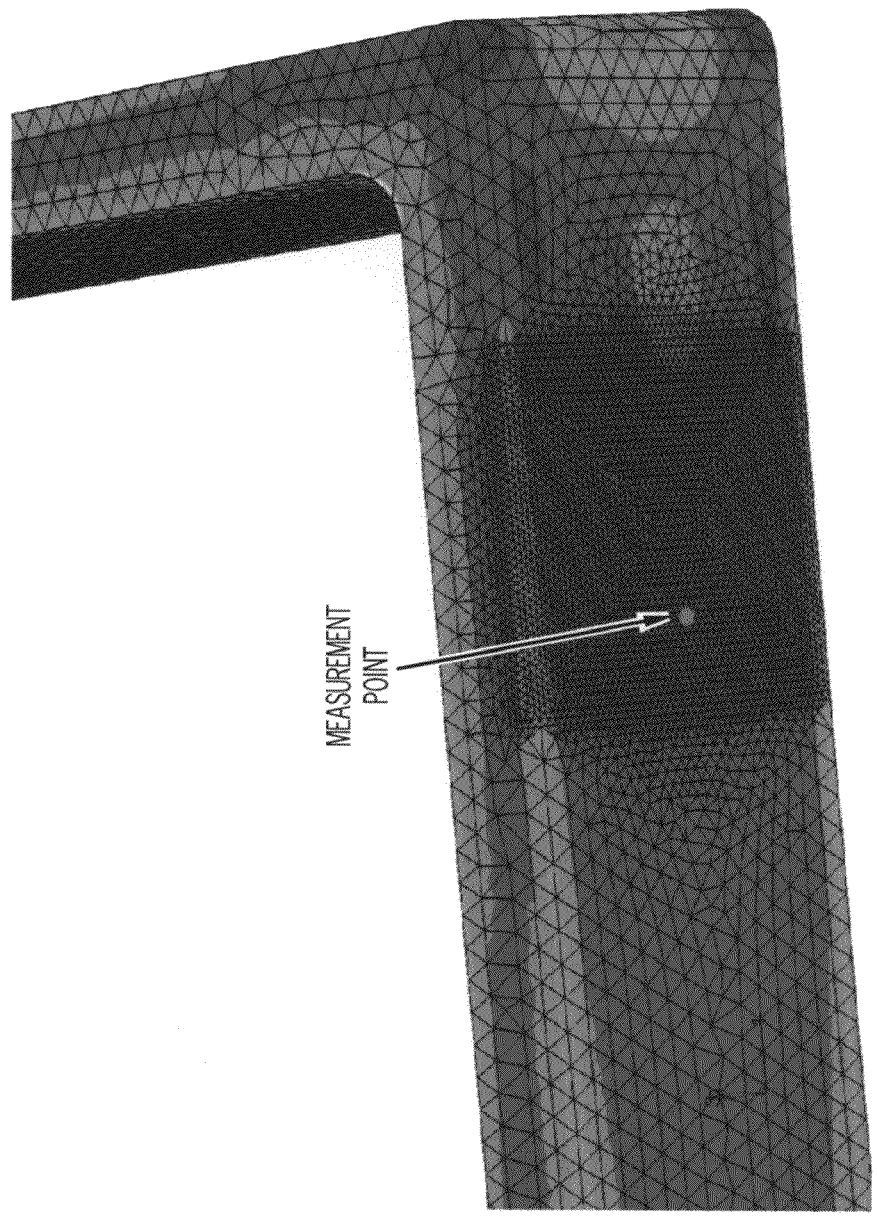
FIG. 8B illustrates a zone of a thin portion of an aluminum casting of which a residual stress is predicted according to another embodiment of the present invention.

Further, generally in the simulation module, the virtual aluminum casting is converted to a mesh scheme using a numeric analytical model 42 or other meshed casting model. Thereby, the virtual zones respectively comprise a plurality of dimensional elements, as shown in FIGS. 8A, 8B, and 10B. The dimensional elements are respectively defined by a length (x), a width (y), and a depth (z). For example, with this mesh scheme, the dimensional element sizes in residual stress measurement areas are about 0.5 mm so that residual stress distribution in the depth direction can be output for evaluation by measurements. The remaining dimensional elements may be, for example, about 2.0 mm. Further, for example, with a mesh scheme, a virtual casting may comprise about 432,714 second order tetrahedral elements and about 611,088 nodes. To increase accuracy and computational efficiency of the embodiments, the dimensional elements may respectively comprise a second-order tetrahedron element.

The simulation module simulates a quenching process of the virtual aluminum casting replicative of the aluminum casting in conditions replicative of those of the quenching used to quench the aluminum casting. During the simulated quenching, the virtual temperatures are monitored by at least one virtual thermocouple. The virtual temperatures generally are specific to the virtual dimensional nodes, elements, and/or zones of the virtual casting.

The heat transfer module uses the virtual node-specific, element-specific and/or zone-specific temperatures to calculate a plurality of heat transfer coefficients specific to the respective virtual surface nodes, elements, and/or zones. The heat transfer coefficients may be calculated using an equation expressed as:

$$h_{tc(x,y,z)} = f(v, T_{qm}, t, \ldots)$$

Here, $h_{tc(x,y,z)}$ is one of the heat transfer coefficients specific to one of the dimensional elements defined by length (x), width (y), and depth (z), v is a velocity of a quench media utilized during the simulated water quenching, $T_{qm}$ is a temperature of the quench media at a time during the simulated quenching, and t is a time of the simulated quenching at which the heat transfer coefficient is calculated.

The heat transfer module may optimize the virtual surface node-specific, element-specific, and/or zone-specific heat transfer coefficients by minimizing differences between the virtual temperatures calculated during the simulated quenching and the experimental temperatures measured during the quenching of the aluminum casting. The differences between the virtual temperatures and the experimental temperatures may also be minimized by adjusting a length of time between the measuring of the virtual temperatures during the simulated quenching (i.e., time interval), as indicated in the flow chart of FIG. 5. Further, the differences between the virtual temperatures and the experimental temperatures may be determined using an equation expressed as:

$$\text{Error} = \sum_{i=1}^{N} \sqrt{\sum_{j=1}^{M} (T_{i,j}^{calc} - T_{i,j}^{expt})^2}$$

where $T_{i,j}^{calc}$ is a temperature of the virtual aluminum casting measured at a time step j of the simulated quenching at thermocouple i, $T_{i,j}^{expt}$ is a temperature of the aluminum casting measured at a time step j of the quenching at thermocouple i, M is a total number of comparisons made for a specific thermocouple, and N is a total number of thermocouples.

Thus, the calculated virtual surface node-specific, element-specific, and/or zone-specific heat transfer coefficients may be optimized using inverse calculations. With the temperature-dependent heat transfer coefficient values assumed for different virtual surface nodes, elements, and/or zones, the temperature history of the virtual casting can be calculated using a heat transfer module. Examples of suitable conventional heat transfer modules include, but are not limited to, ABAQUS and MagmaSoft. During the course of heat transfer coefficient optimization, the temperature- and virtual surface node-dependent, element-dependent, and/or zone-dependent heat transfer coefficients generally are adjusted and determined using a gradient method that generally spans a defined length of time of the quenching process.

The heat transfer module uses the virtual surface node-specific, element-specific, and/or zone-specific heat transfer coefficients to calculate virtual node-specific, element-specific, and/or zone-specific temperatures. These temperatures may be expressed as:

$$T_{(x,y,z)} = f(h_{tc}, K, t)$$

where $T_{(x,y,z)}$ refers to the temperature of a specific virtual node, $h_{tc}$ refers to the heat transfer coefficient of the virtual surface nodes, elements, and/or zones, K refers to thermal conductivity, and t refers to the time during the quenching at which the heat transfer coefficient was calculated. Thus, the virtual node-specific temperatures are respectively specific to a designated time within the length of time of the quenching process.

Figure 3A:
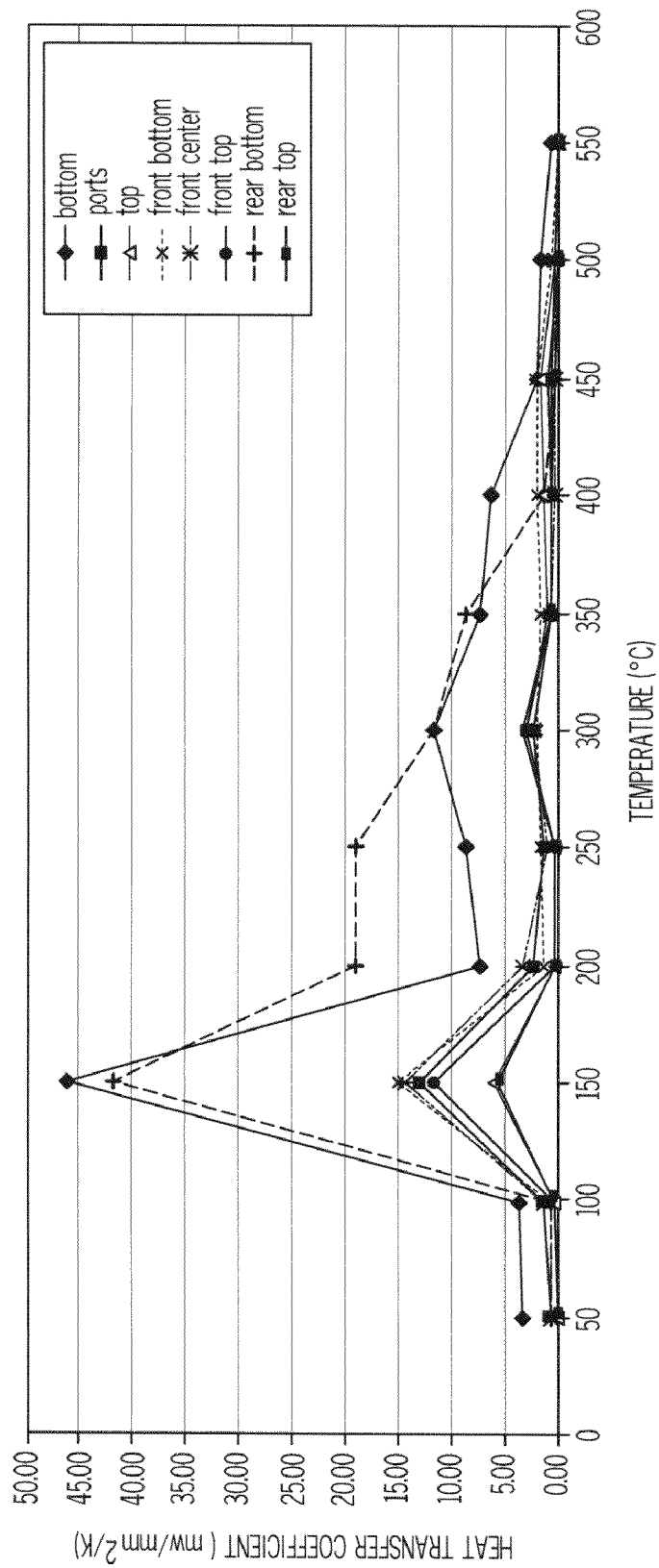
FIG. 3A graphically illustrates temperature-dependent heat transfer coefficient values at different surface zones of a cylinder head aluminum casting during water quench according to another embodiment of the present invention.
Figure 3B:
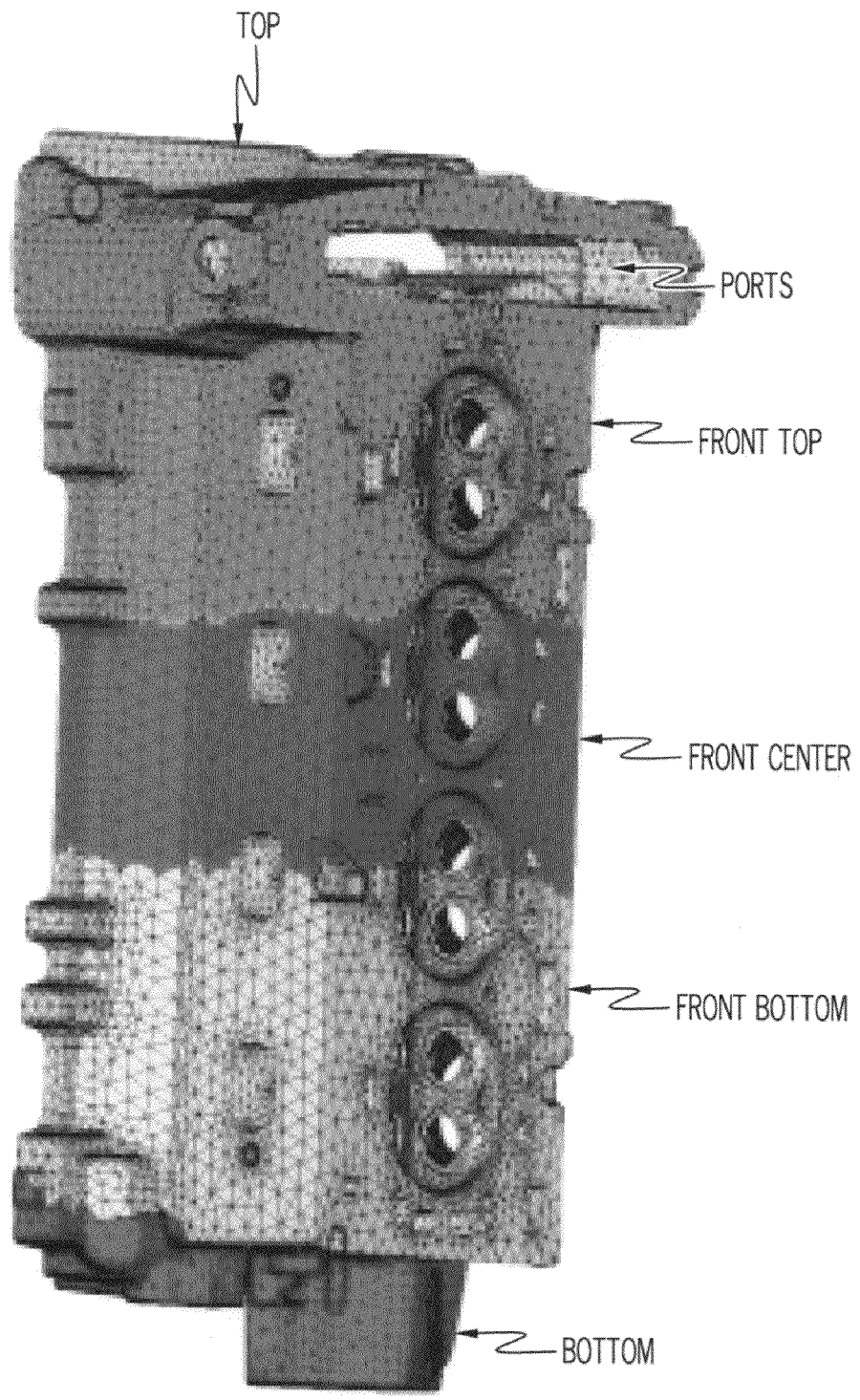
FIG. 3B illustrates the different surface zones of the cylinder head aluminum casting for which the temperature-dependent heat transfer coefficient values are graphically illustrated in FIG. 3A.
Figure 5:
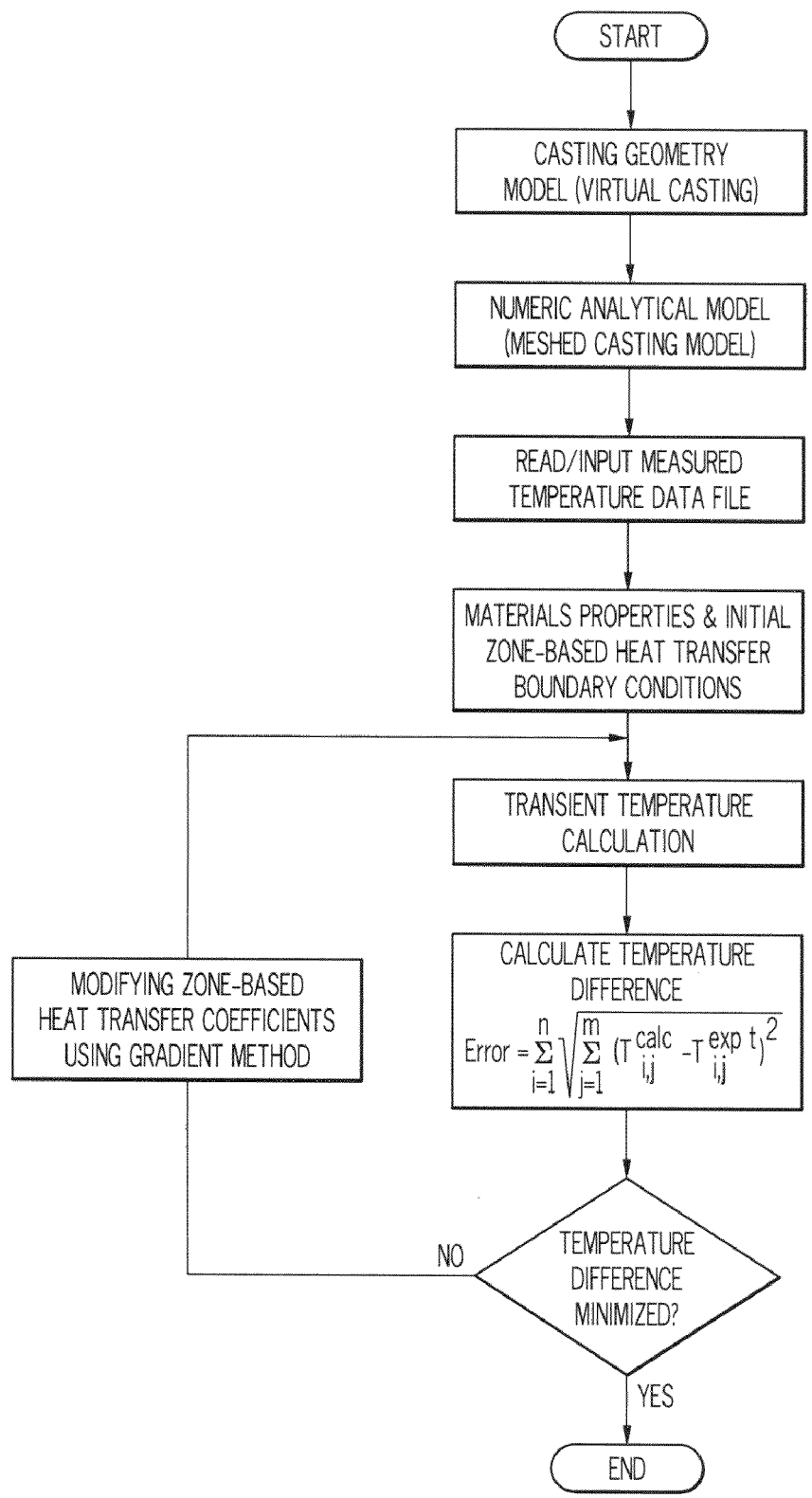
FIG. 5 illustrates a flow chart to optimize heat transfer coefficients according to another embodiment of the present invention.

The temperatures for each virtual node may be correlated to provide a thermal history of the respective virtual nodes indicating respective changes in temperature during the quenching process. The thermal history of the respective virtual nodes during quenching may then be compared with the experimentally measured temperatures of the correlated nodes of the casting. As shown in FIG. 5, the optimization process of the heat transfer coefficients may iterate until the difference between the calculated thermal history and the experimental measurements is minimized. FIG. 3A graphically illustrates examples of the temperature-dependent heat transfer coefficients optimized for different surface zones of an aluminum cylinder head quenched vertically in water, shown in FIG. 3B. Further, FIG. 3A indicates that different surface zones have different heat transfer coefficients and particularly elevated heat transfer coefficients are observed between about 100° C. and about 200° C. for all of the surface zones.

In addition to thermal history, material properties at quench state of the casting also tend to impact formation of residual stresses. For example, relatively soft materials tend to have lower residual stresses with higher potential for distortion. There are several conventional approaches to modeling the material constitutive behavior of castings. For example, one conventional approach is to develop empirical equations from the experimental stress-strain curves for different temperatures, strain rates, and microstructures. This approach, however, requires a large number of experimental tests in order to cover a variety of microstructures and test conditions. Another exemplary conventional approach is to employ unified viscoplastic constitutive models. Unified viscoplastic models can be expressed as:

$$\dot{\varepsilon}_{ij}^{in} = f(\bar{\sigma}, R, K)\sqrt{\frac{3}{2}}\frac{S_{ij} - \alpha_{ij}}{\bar{\sigma}}, \tag{3}$$

Kinematic Hardening:

$$\alpha_{ij} = \sum_{k=1}^{m} \alpha_{mij}, \tag{4}$$

$$\dot{\alpha}_{mij} = C_m \dot{\varepsilon}_{ij}^{in} - r^D(\bar{\alpha}, \dot{p}, h_m)\dot{p}\alpha_{mij} - r^s(\bar{\alpha}, \dot{p}, h_m)\alpha_{mij}, \tag{5}$$

Isotropic Hardening:

$$\dot{R} = f(R, h_\alpha)\dot{p} - f_{rd}(R, h_\alpha)R - f_{rs}(R, h_\alpha), \text{ and} \tag{6}$$

the drag stress evolution $$\dot{K} = \phi(K, h_\alpha)\dot{p} - \phi_{rd}(K, h_\alpha)K - \phi_{rs}(K, h_\alpha). \tag{7}$$

The evolution equations for the kinematic, isotropic, and drag stress generally include three parts: the hardening term, the dynamic recovery term, and the static recovery term. The conventional unified viscoplastic models have similar frameworks although different evolution equations are used. Generally, viscoplastic models can describe the creep and time-dependent cyclic inelastic deformation, including the strain rate sensitivity and the dwell time effect. The conventional models, however, cannot represent the cyclic thermal-mechanical inelastic deformation behavior, the impact of an unusual amount of cyclic softening, the thermal exposure (including phase transformation), and microstructure variations.

The material constitutive model of the embodiments of the present invention calculates a total strain of the respective virtual nodes, elements, and/or zones to define a virtual node-specific, element-specific, and/or zone-specific stress-strain relationship using the virtual node-specific, element-specific, and/or zone-specific temperatures and a coefficient of thermal expansion/contraction. When the temperature of a material changes, energy stored in intermolecular bonds between atoms changes. When the stored energy increases, due to the increased temperature, so does the length of the molecular bonds. As a result, solids typically expand in response to heating and contract in response to cooling. This dimensional response to temperature change may be expressed by its coefficient of thermal expansion or thermal contraction. The thermal expansion coefficient is a thermodynamic property of a material. It relates the change in temperature to the change in a material's linear dimensions. It also is the fractional change in length per degree of temperature change and may be expressed as $L=L_0(1+\alpha \Delta T)$, where $L_o$ is the original length, L the new length, $\Delta T$ the temperature change, and $\alpha$ the coefficient of thermal expansion. The virtual node-specific, element-specific, and/or zone-specific total strain is divided into elastic, plastic, creep and other thermal strains due to thermal exposure, such as phase transformations including precipitate hardening in heat-treatable aluminum castings. The plastic strain is described by time-independent plastic model while the creep strain is characterized by creep law. The other thermal strain due to phase transformation is described by precipitate hardening model.

The material constitutive model, and, thus, total stain, may be expressed as:

$$\frac{\sigma}{\mu(T)} = C_e(\dot{\varepsilon}, T)\frac{\hat{\sigma}_e}{\mu_0} + C_p(\dot{\varepsilon}, T)\frac{\hat{\sigma}_p}{\mu_0} + C_{ppt}(\dot{\varepsilon}, T)\frac{\hat{\sigma}_{ppt}}{\mu_0}$$

where $C_e(\dot{\varepsilon}, T)$, $C_p(\dot{\varepsilon}, T)$, and $C_{ppt}(\dot{\varepsilon}, T)$ are referred as velocity-modified temperatures for intrinsic strength (i.e., elastic strain), strain hardening (i.e., plastic strain), and precipitate hardening (i.e., phase transformation), respectively; T is temperature measured in Kelvin and $\dot{\varepsilon}$ is the strain rate; $\mu_0(=28.815$ GPa) is a reference shear modulus value at 0 K and $\dot{\varepsilon}=10^7$ s$^{-1}$ for the aluminum casting; and $\mu(T)$ is a temperature-dependent shear modulus. $\mu(T)$ may be given as:

$$\mu(T) = \mu_0 - \frac{3440}{\exp\left(\frac{215}{T}\right)-1}$$

Before yield, the stress-strain curve generally is treated in this material constitutive model as fully elastic, generally depending only on the Young's modules E and yield stress $\sigma_y$. E may be determined from the stress-strain curves of tensile tests at different temperatures and strain rates using a second-order polynomial:

$$E=67,599+72353T-0.14767T^2 \quad (10)$$

where E is in MPa and T is in Kelvin.

At yield, generally, $\hat{\sigma}_p=0$ and the yield stress $\sigma_y$ depends only on the intrinsic strength $\hat{\sigma}_e$, as scaled by $C_e(\dot{\varepsilon}, T)$. Whereas, after yield, the flow stress generally is modeled through the evolution of $\hat{\sigma}_p$ and $\hat{\sigma}_{ppt}$. Following Voce, a liner form may be used in the material constitutive model for strain hardening, where strain hardening may be expressed as:

$$\hat{\sigma}_p = \hat{\sigma}'_p + \frac{\mu(T)}{\mu_0}\theta_0\left[1-\frac{\hat{\sigma}'_p}{\hat{\sigma}_{os}}\right]\partial\varepsilon$$

where $\theta_0$ represents the slope of the stress-strain curve at yield in the reference state (0 K, $\dot{\varepsilon}=10^7$ s$^{-1}$) and $\hat{\sigma}_{os}$ is a parameter of one of the material properties of the aluminum casting. Further, the precipitation hardening may be expressed as:

$$\hat{\sigma}_{ppt} = \frac{M}{b}\frac{\int_0^\infty f(r_{eq})F(r_{eq})dr_{eq}}{\int_0^\infty f(l)dl}$$

where M is the Taylor factor; b is the Burgers vector; $r_{eq}$ and l are precipitate equivalent circle radius ($r_{eq}=0.5\ d_{eq}$) and spacing on the dislocation line, respectively; $f(r_{eq})$ is a precipitate size distribution; f(l) is a particle spacing distribution; and $F(r_{eq})$ is an obstacle strength of a precipitate of radius $r_{eq}$.

Figure 6:
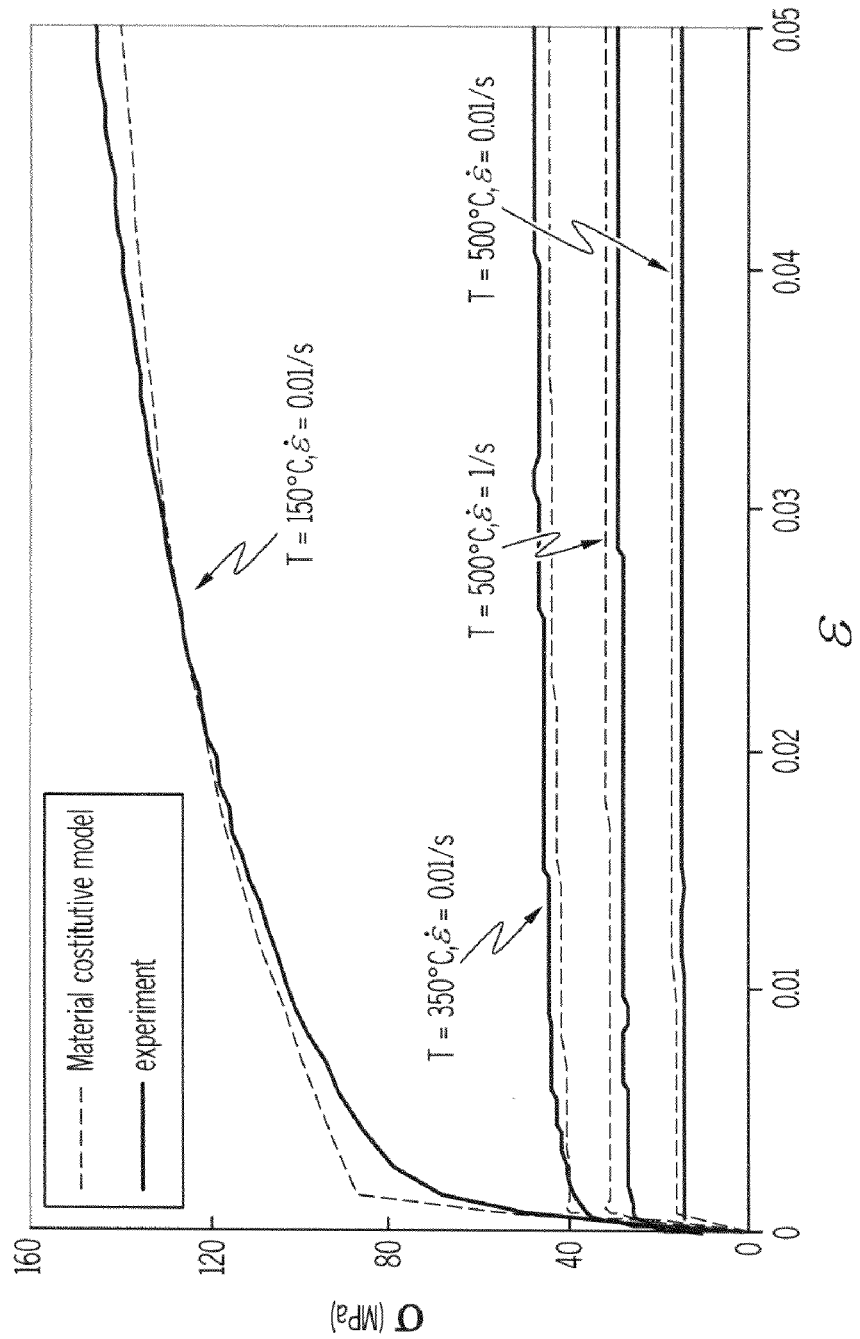
FIG. 6 graphically illustrates a comparison of experimental stress-strain curves with stress-stain curves determined by a material constitutive model according to another embodiment of the present invention.

Based on calculations of the foregoing material constitutive model, FIG. 6 graphically illustrates a comparison of the predicted tensile stress-strain curves and the experimentally determined data of the aluminum casting. FIG. 6 illustrates that the predictions derived from the material constitutive model are in very good agreement with actual material behavior of the aluminum casting.

Figure 7:
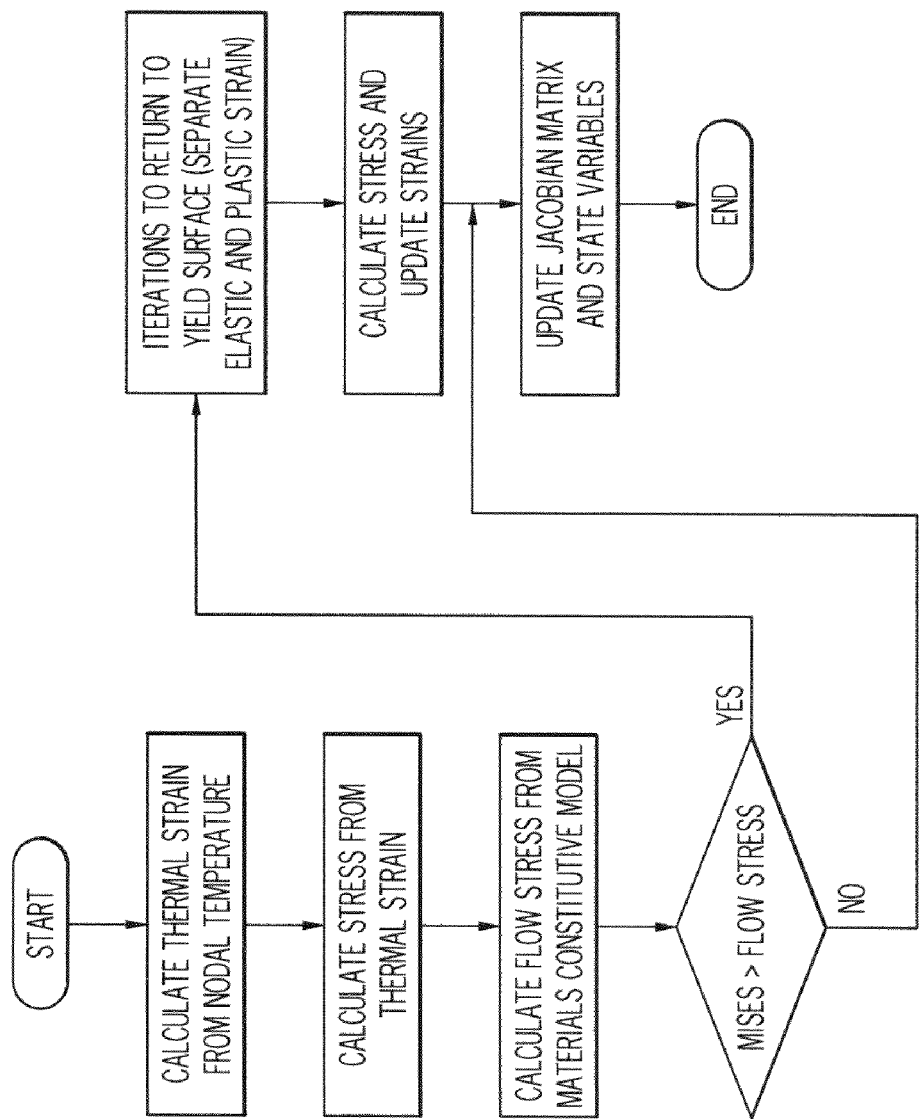
FIG. 7 illustrates a flow chart of calculations performed by a user material subroutine module according to another embodiment of the present invention.

The user material subroutine module uses the material constitutive model to calculate a plurality of thermal stresses and strains at integration points defining the dimensional elements of the respective virtual aluminum casting. More particularly, the user material subroutine module calculates a plurality of thermal stresses and strains at the respective integration points by calculating trial elastic stress, flow stress, and plastic flow, by obtaining equivalent plastic strains and hardening rates and a Jacobian Matrix for plasticity, and by calculating plasticity. FIG. 7 presents a flow chart illustrating a process of the above-described calculations that may be performed by the user material subroutine module.

For example, in one embodiment, the calculations of the user material subroutine module may be performed as follows. Trial elastic stress may be calculated using what typically are fully elastic strains provided to the user material subroutine module by the system. Trial elastic stress may be expressed as:

$$\delta_{ij}=\lambda\delta_{ij}\varepsilon^{el}_{kk}+2\mu\varepsilon^{el}_{kk}$$

where $\varepsilon^{el}_{kk}$ is the driving variable calculated from a change in temperature and a geometric structure of the virtual aluminum casting and provided to the user material subroutine module. A Von Mises stress based at least substantially on elastic behavior may then be calculated by the user material subroutine module and expressed as:

$$\bar{\sigma} = \sqrt{\frac{1}{2}((\sigma_{11}-\sigma_{22})^2 + (\sigma_{11}-\sigma_{33})^2 + (\sigma_{22}-\sigma_{33})^2 + 6*\sigma_{12}^2 + 6*\sigma_{23}^2 + 6*\sigma_{13}^2)}$$

$$= \sqrt{\frac{3}{2}S_{ij}S_{ij}}$$

$$= \sqrt{\frac{3}{2}((S_{11})^2+(S_{33})^2+(S_{22})^2+2*S_{12}^2+2*S_{23}^2+2*S_{13}^2)}$$

where $$S_{ij}=S_{ij}-\frac{1}{3}\delta_{ij}\sigma_{kk}.$$

The user material subroutine module may then determine whether a predicted elastic stress is larger than an experimentally determined yield stress so that plastic flow may occur. Plastic stress may be expressed as:

$$\dot{\varepsilon}_{ij}^{pl} = \frac{3S_{ij}}{2\sigma_y}\dot{\bar{\varepsilon}}^{pl}.$$

The user material subroutine module also may use a backward Euler method to integrate the equations for a calculation of plastic strain:

$$\bar{\sigma}^{pr} - 3\mu\Delta\bar{\varepsilon}^{pl} = \sigma_y(\bar{\varepsilon}^{pl}).$$

After the above equation is solved, the actual plastic strain is determined. The thermal stresses and strains may then be updated, where:

$$\sigma_{ij} = \eta_{ij}\sigma_y + \frac{1}{3}\delta_{ij}\sigma_{kk}^{pr}$$

$$\Delta\varepsilon_{ij}^{pl} = \frac{3}{2}\eta_{ij}\Delta\bar{\varepsilon}^{pl}$$

$$\eta_{ij} = \frac{S_{ij}^{pr}}{\bar{\sigma}^{pr}}.$$

Thereafter, the user material subroutine module may calculate a Jacobian Matrix at the respective integration points to solve respective plasticity, where:

$$\Delta\dot{\sigma}_{ij} = \lambda^*\delta_{ij}\Delta\varepsilon_{kk} + 2\mu^*\Delta\varepsilon_{ij} + \left(\frac{h}{1+h/3\mu} - 3\mu^*\right)\eta_{ij}\eta_{kl}\Delta\varepsilon_{kl}$$

where $\mu^* = \mu\sigma_y/\bar{\sigma}^{pr}$, $\lambda^* = k - \frac{2}{3}\mu^*$, and $h = d\sigma_y/d\bar{\varepsilon}^{pl}$.

The user material subroutine module also calculates a strain rate and a change in strain at the respective integration points. The change in strain at integration points of the dimensional elements of the respective virtual aluminum casting are calculated from differences in the time-specific, virtual node-specific temperatures and a geometric structure of the respective virtual aluminum casting with an assumption of zero plastic strains. The change in strain may be expressed as:

$$d\bar{\varepsilon} = \frac{\sqrt{2}}{3}\sqrt{\frac{(d\varepsilon_{11}-d\varepsilon_{22})^2 + (d\varepsilon_{11}-d\varepsilon_{33})^2 + (d\varepsilon_{22}-d\varepsilon_{33})^2 +}{6*d\varepsilon_{12}^2 + 6*d\varepsilon_{23}^2 + 6*d\varepsilon_{13}^2}}.$$

where $d\epsilon_{ij}$ is one of the six components of strain increment for each integration point, and dt is time increment. Thereafter, the strain rate may be calculated based on the change in strain at the respective integration points. Strain rate may be expressed as:

$$\dot{\varepsilon} = \frac{d\bar{\varepsilon}}{dt}.$$

The computer readable-medium, using the calculated changes in strain and strain rates, may then calculate at least one of a residual stress and distortion at the respective integration points of the dimensional elements of the respective virtual zones of the virtual aluminum casting to predict at least one residual stress and distortion of the quenched aluminum casting. Residual stress may be expressed as:

$$\sigma_r = f(\Delta\epsilon, T, \dot{\epsilon}, SDAS).$$

In calculating residual stress and/or distortion, generally all required temperature-dependent physical properties of aluminum castings may be calculated from computational thermodynamics. Table 1 lists various physical properties of aluminum alloy castings 319 and A356 used in the modeling. To increase accuracy and computational efficiency, second-order tetrahedron dimensional elements may be used. DC3D10, a 10-node quadratic heat transfer tetrahedron may be employed for heat transfer thermal analysis, and C3D10, a 10-node modified quadratic tetrahedron for stress analysis.

TABLE 1

Material properties of 319 and A356 aluminum alloy castings.

| Alloy | T (C.) | Density (g/cm)3) | Average expansion coeff. (10e-6 1/K) | Thermal conductivity (W/(m * K)) | Young's modulus (GPa) | Shear modulus (GPa) | Poisson's ratio | Specific heat (J/(g K)) |
|---|---|---|---|---|---|---|---|---|
| 319 | 550 | 2.62782 | 32.36493 | 128.17553 | 18.49579 | 6.66119 | 0.38832 | 7.0722 |
| | 500 | 2.66402 | 25.81007 | 153.03718 | 56.30864 | 20.90502 | 0.34677 | 1.0802 |
| | 450 | 2.67568 | 25.30192 | 151.261 | 58.40357 | 21.73539 | 0.34351 | 1.0566 |
| | 400 | 2.68704 | 24.79681 | 149.4268 | 60.49212 | 22.56444 | 0.34043 | 1.035 |
| | 350 | 2.69809 | 24.29472 | 147.50036 | 62.57232 | 23.3911 | 0.33752 | 1.0148 |
| | 300 | 2.70882 | 23.79566 | 145.44036 | 64.64311 | 24.21462 | 0.3348 | 0.9948 |
| | 250 | 2.71923 | 23.29963 | 143.1957 | 66.70471 | 25.03474 | 0.33224 | 0.9748 |
| | 200 | 2.72932 | 22.80662 | 140.7011 | 68.75737 | 25.85122 | 0.32987 | 0.9548 |
| | 150 | 2.73908 | 22.31665 | 137.86874 | 70.80134 | 26.66381 | 0.32767 | 0.9336 |
| | 100 | 2.7485 | 21.82971 | 134.57266 | 72.83693 | 27.47228 | 0.32564 | 0.9106 |
| | 50 | 2.75758 | 21.3458 | 130.61714 | 74.86455 | 28.27645 | 0.3238 | 0.884 |
| | 25 | 2.762 | 21.15311 | 128.29638 | 75.87554 | 28.67688 | 0.32294 | 0.8716 |
| A356 | 550 | 2.57496 | 26.77592 | 169.81029 | 46.444404 | 17.04294 | 0.36256 | 3.9606 |
| | 500 | 2.58711 | 25.90735 | 171.67991 | 52.86888 | 19.49988 | 0.35562 | 1.1084 |
| | 450 | 2.59849 | 25.39366 | 169.93562 | 54.84217 | 20.27902 | 0.35219 | 1.081 |
| | 400 | 2.60957 | 24.88301 | 168.19032 | 56.8093 | 21.05691 | 0.34895 | 1.0588 |
| | 350 | 2.62034 | 24.3754 | 166.4176 | 58.77156 | 21.83373 | 0.34598 | 1.038 |
| | 300 | 2.63081 | 23.87084 | 164.58263 | 60.72826 | 22.60888 | 0.34302 | 1.0174 |
| | 250 | 2.64096 | 23.36932 | 162.63878 | 62.67958 | 23.38209 | 0.34033 | 0.9968 |
| | 200 | 2.65079 | 22.87085 | 160.52211 | 64.62569 | 24.1531 | 0.33783 | 0.9762 |
| | 150 | 2.6603 | 22.37542 | 158.14154 | 66.56677 | 24.92165 | 0.33552 | 0.9544 |

TABLE 1-continued

Material properties of 319 and A356 aluminum alloy castings.

| Alloy | T (C.) | Density (g/cm) 3) | Average expansion coeff. (10e−6 1/K) | Thermal conductivity (W/(m * K)) | Young's modulus (GPa) | Shear modulus (GPa) | Poisson's ratio | Specific heat (J/(g K)) |
|---|---|---|---|---|---|---|---|---|
| | 100 | 2.66948 | 21.88303 | 155.36033 | 68.50303 | 25.68748 | 0.33339 | 0.9308 |
| | 25 | 2.68262 | 21.19882 | 149.91632 | 71.39893 | 26.8306 | 0.33055 | 0.891 |

Figure 8B:
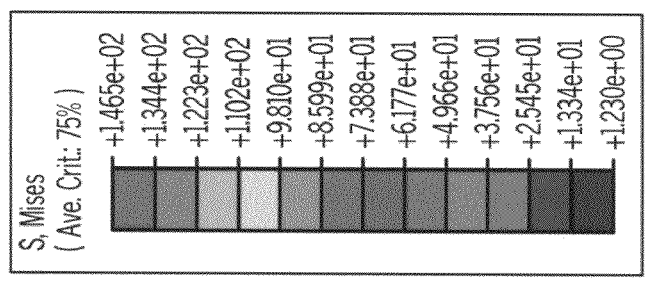
Figure 9:
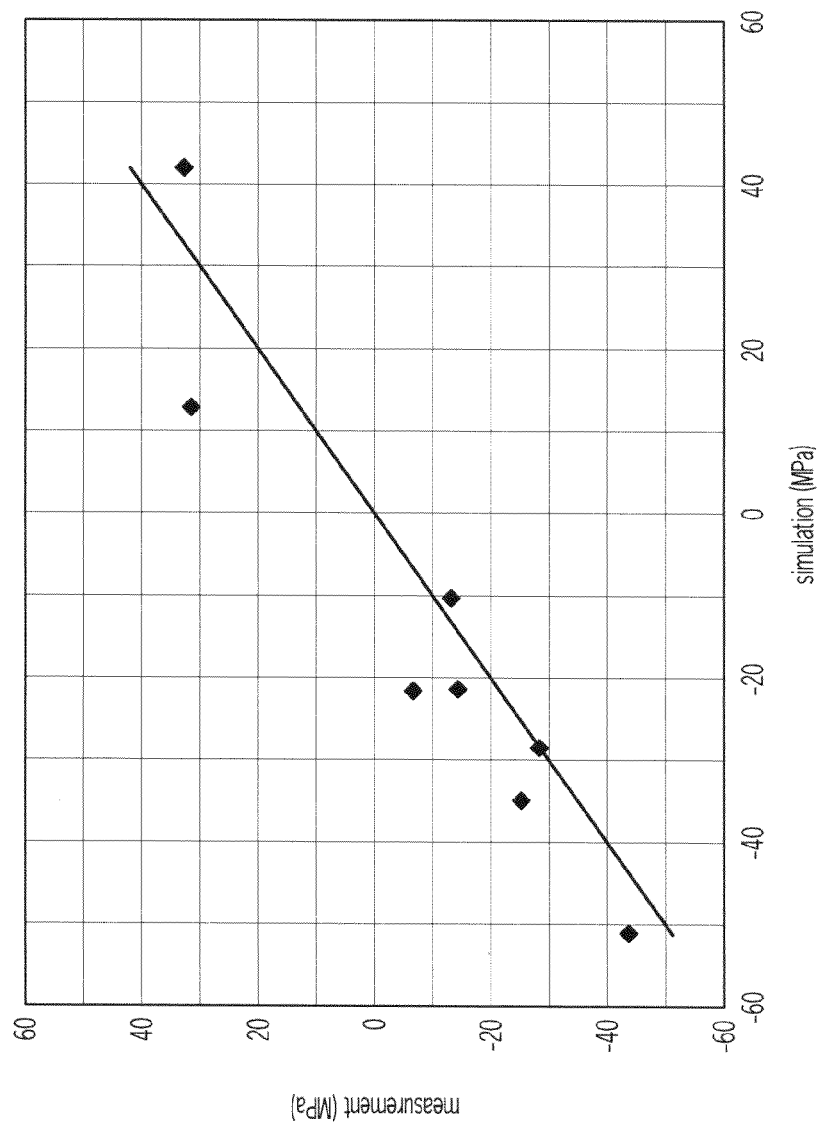
FIG. 9 graphically illustrates a comparison of experimentally determined residual stresses of the aluminum casting illustrated in FIG. 2A with residual stresses of a virtual aluminum casting predicted according to another embodiment of the present invention.

FIGS. 8 and 9 show predictions of residual stresses in a water-quenched frame-shape mixed-wall (i.e., thick wall and thin wall) aluminum casting and the comparison with experimental residual stress measurements. It is seen that for the castings tested, the predicted residual stresses are in good agreement with the experimental measurements. It is also apparent that residual stresses in the quenched aluminum casting vary with heat transfer coefficient values—e.g., the higher the heat transfer coefficient values, the greater the residual stresses.

Figure 10A:
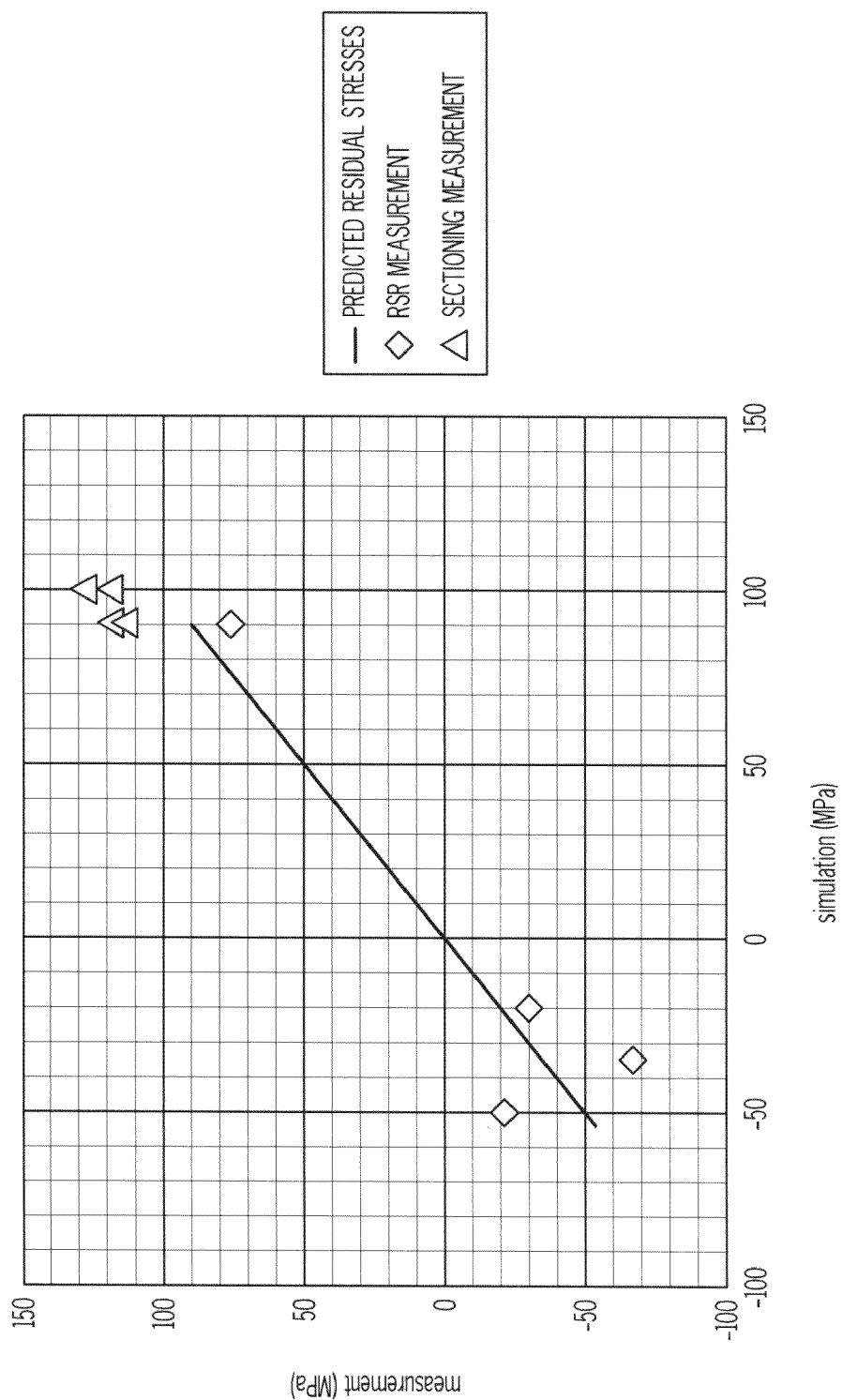
FIG. 10A graphically illustrates a comparison of experimentally determined residual stresses of a cylinder head aluminum casting illustrated in FIG. 3A with residual stresses of a virtual cylinder head aluminum casting predicted according to another embodiment of the present invention.
Figure 10B:
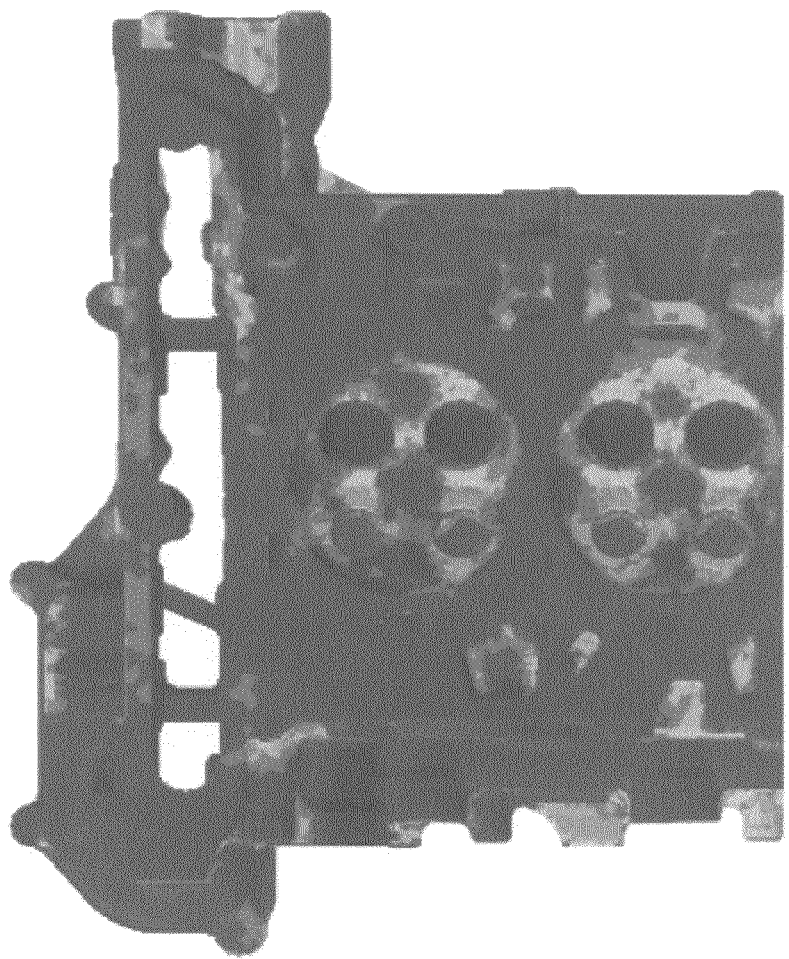
FIG. 10B illustrates a portion of the virtual cylinder head aluminum casting plotted in FIG. 10A with residual stresses thereof predicted according to another embodiment of the present invention.
Figure 10B:
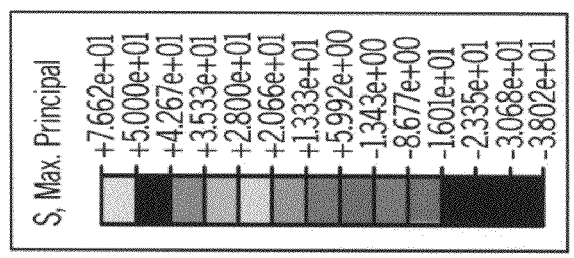
Figure 10C:
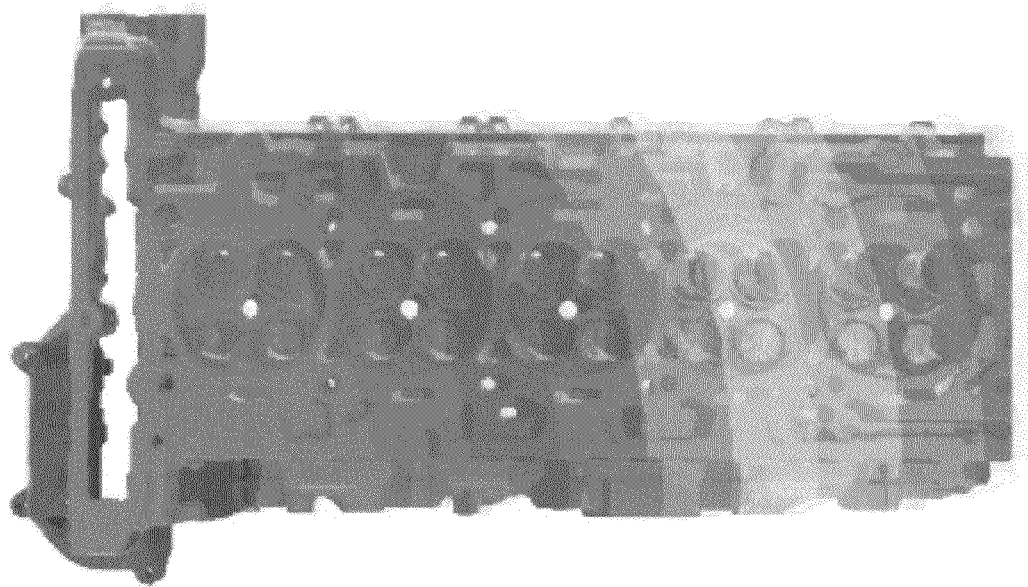
FIG. 10C illustrates a portion of a virtual cylinder head aluminum casting with distortion thereof predicted according to another embodiment of the present invention.
Figure 10C:
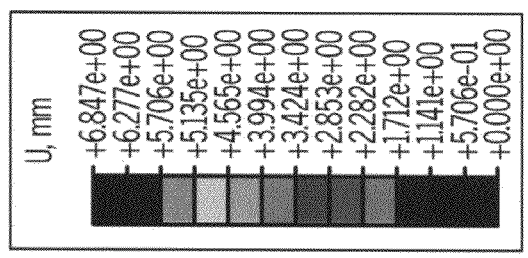

Further, FIGS. 10A and 10B show predictions of residual stresses in a water-quenched cylinder head aluminum casting and the comparison with experimental residual stress measurements. Again, the predicted residual stresses are in good agreement with the experimental measurements. Thus, FIGS. 8-10B indicate that the embodiments of the present invention can predict residual stresses in the quenched aluminum castings with high accuracy.

Figure 11:
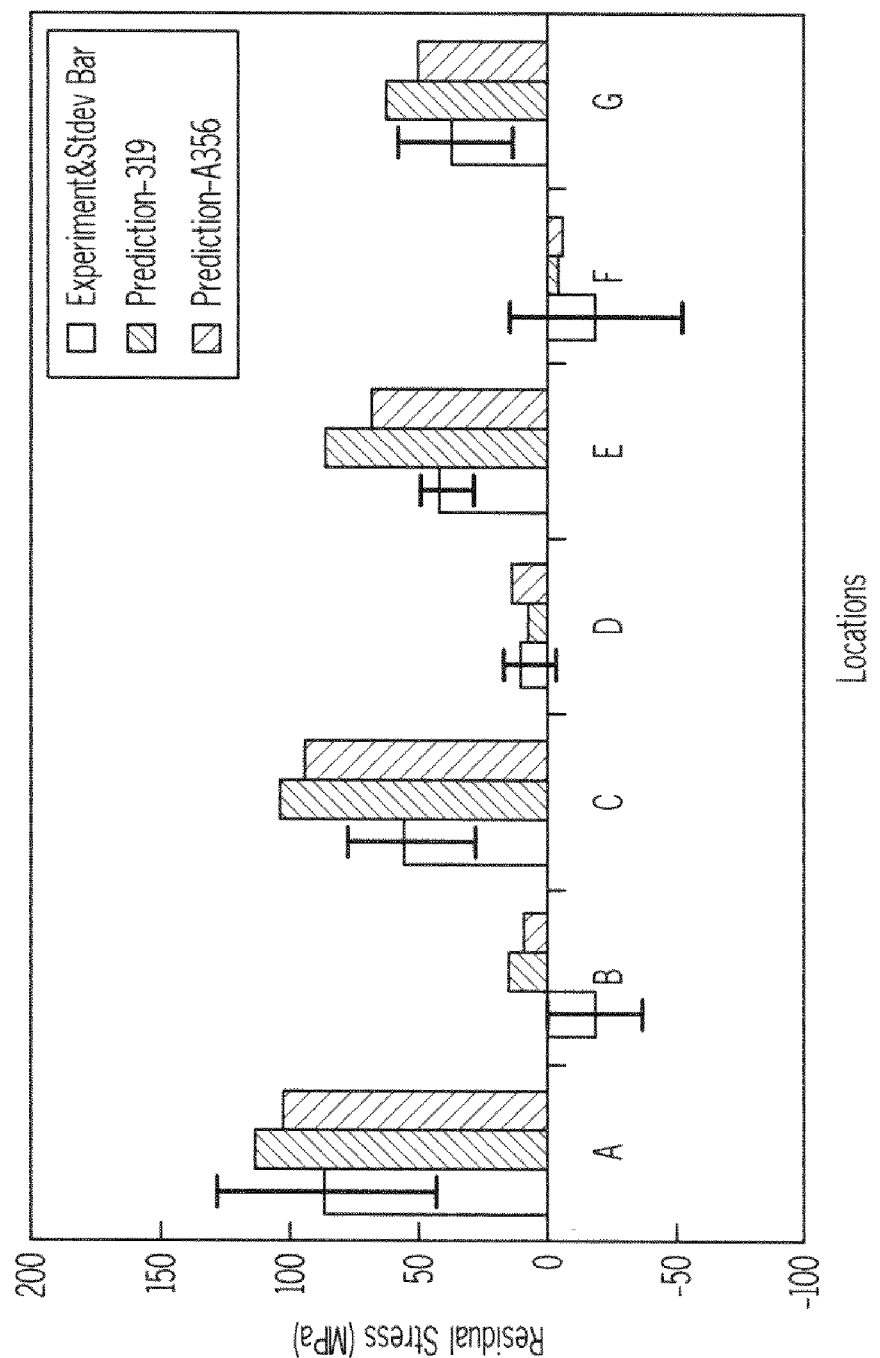
FIG. 11 graphically illustrates a comparison of experimentally determined residual stresses of an aluminum casting with residual stresses of a 319 aluminum casting and an A356 aluminum casting both predicted according to another embodiment of the present invention.

The residual stress-predictive embodiments also have been applied to the production of cylinder head aluminum castings to study the residual stress effect on cylinder head fatigue. In one study, a LNF cylinder head aluminum casting cracked at an intersection of an intake port and a combustion dome in the rear of the cylinder head at 4200 cycles during a GETC (Global Engine Thermal Cycle) dyno test. The crack initiated at a fillet between the intake port and a pillar at a water jacket surface. The residual stress was measured at several zones of the cylinder head and the test data was used to validate the predictions of the residual stress model. As shown in FIG. 11, reasonable correlation was made between residual stress predictions and testing data for different casting zones A-G. Then, the predicted residual stress was applied in cylinder head fatigue analysis. As shown in Table 2, below, the safety factor calculated at the crack location using mean−3 sigma material strength properties based on the operating stresses resulting from engine thermal cycle (without considering residual stress) was 1.32, which exceeds the design target of 1.2. By including the averaged residual stress of 60 MPa around the crack location, the safety factor was dropped to 0.98, which indicate the high possibility of failure and that correlates more closely with the test data. Therefore, including residual stress in cylinder head fatigue analysis facilitates and enhances evaluation of structural durability of aluminum castings that are subjected to solution treatment and quenching in casting design processes.

TABLE 2

| | LE5 | LNF |
|---|---|---|
| Dyno test results | passed | Cracked @ 4200 GETC cycles |
| Aluminum Type | 319 spm | 356 spm (water quench) |
| UTS (−3 sigma) (MPa) | 170 | 218 |
| HCF (−3 sigma) (MPa) | 50 | 60 |
| LCF (−3 sigma) (MPa) | 125 | 160 |

TABLE 2-continued

| | LE5 | LNF | | | |
|---|---|---|---|---|---|
| Residual Stress (MPa) | No | 0 | 20 | 40 | 60 |
| SF (target 1.2) | 1.13 | 1.32 | 1.2 | 1.08 | 0.98 |
| Mean Stress (MPa) | 99 | 104 | 124 | 144 | 164 |
| Alt Stress (MPa) | 37 | 42 | 42 | 42 | 42 |

It is noted that while the majority of the description provided herein is specific to an embodiment of the present invention relating to a system to predict at least one of a residual stress and distortion of a quenched aluminum casting, the same description applies equally consistently to other embodiments of the present invention relating to methods and articles of manufacture to predict at least one of a residual stress and distortion of a quenched aluminum casting.

Further, it is noted that recitations herein of a component of an embodiment being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural factors of the component.

It is noted that terms like "generally," "commonly," and "typically," when utilized herein, are not utilized to limit the scope of the claimed embodiments or to imply that certain features are critical, essential, or even important to the structure or function of the claimed embodiments. Rather, these terms are merely intended to identify particular aspects of an embodiment or to emphasize alternative or additional features that may or may not be utilized in a particular embodiment.

For the purposes of describing and defining embodiments herein it is noted that the terms "substantially," "significantly," and "approximately" are utilized herein to represent the inherent degree of uncertainty that may be attributed to any quantitative comparison, value, measurement, or other representation. The terms "substantially," "significantly," and "approximately" are also utilized herein to represent the degree by which a quantitative representation may vary from a stated reference without resulting in a change in the basic function of the subject matter at issue.

Having described embodiments of the present invention in detail, and by reference to specific embodiments thereof, it will be apparent that modifications and variations are possible without departing from the scope of the embodiments defined in the appended claims. More specifically, although some aspects of embodiments of the present invention are identified herein as preferred or particularly advantageous, it is contemplated that the embodiments of the present invention are not necessarily limited to these preferred aspects.

What is claimed is:

1. A system to predict at least one of a residual stress and distortion of a quenched aluminum casting, the system comprising:
an information input configured to receive information relating to at least one of a plurality of at least one of nodes, elements, and zones of the aluminum casting during a quenching thereof;
an information output configured to convey information relating to at least one of the residual stress and distortion of the aluminum casting predicted by the system;
a processing unit; and
a non-transitory computer-readable medium comprising a computer-readable program code embodied therein, said computer-readable medium cooperative with the processing unit, the information input and the information output such that the received information is operated upon by the processing unit and computer-readable program code to be presented to the information output as a prediction of at least one of the residual stress and distortion of the aluminum casting, said computer-readable program code comprising a simulation module, a heat transfer module, a strain and stress analysis module, and a user material subroutine module defining a material constitutive model, wherein:
the simulation module simulates a quenching process of a virtual aluminum casting replicative of the aluminum casting and the quenching thereof, the virtual aluminum casting comprising a plurality of at least one of virtual surface nodes, elements, and zones correlated with the surface geometries of the aluminum casting, the virtual aluminum casting respectively comprising a plurality of at least one of dimensional nodes, elements, and zones,
the heat transfer module calculates a plurality of heat transfer coefficients specific to the respective virtual surface nodes, elements, and zones,
the heat transfer module calculates a plurality of at least one of virtual node-specific, element-specific, and zone-specific temperatures using the heat transfer coefficients, the virtual node-specific, element-specific and zone specific-temperatures respectively specific to a time of the simulated quenching,
the strain and stress analysis module calculates a total strain of the respective virtual nodes, elements, and zones to define at least one of a virtual node-specific, element-specific, and zone-specific stress-strain curve using the respective virtual node-specific, element-specific, and zone-specific temperatures and a coefficient of thermal expansion/contraction,
the material constitutive model defined by the user material subroutine module calculates a plurality of thermal stresses and strains at integration points defining the dimensional elements and zones of the respective virtual aluminum casting,
the user material subroutine module calculates a strain rate and a change in strain at the respective integration points, and
the material constitutive model calculates at least one of a residual stress and distortion at the respective integration points to predict at least one residual stress and distortion of the aluminum casting.

2. The system of claim 1, wherein the computer-readable medium comprise a finite element analysis module comprising at least one of the simulation module, the heat transfer module, the strain and stress analysis module, and the material constitutive model defined by the user material subroutine module and is cooperatively coupled with any of the simulation module, the heat transfer module, the strain and stress analysis module, and the material constitutive model not comprised by the finite element analysis module.

3. The system of claim 1, wherein the received information comprises information relating to at least one of a transient temperature distribution of at least one of the nodes, elements, and zones of the aluminum casting measured during a quenching thereof and at least one of a plurality of material properties of at least one of the nodes, elements, and zones of the aluminum casting during quenching.

4. The system of claim 3, wherein the material properties of the aluminum casting comprise at lease of one of microstructure characteristics and thermophysical and mechanical properties.

5. The system of claim 4, wherein the microstructure characteristics comprise at least a secondary dendrite arm spacing (SDAS) of the aluminum casting.

6. The system of claim 1, wherein the virtual surface zones of the virtual aluminum casting comprise at least one top surface of the virtual aluminum casting and at least one bottom surface of the virtual aluminum casting relative to the quench orientation.

7. The system of claim 6, wherein the virtual surface zones respectively comprise a plurality of dimensional elements respectively defined by a length (x), a width (y), and a depth (z).

8. The system of claim 7, wherein the heat transfer coefficients are calculated using an equation expressed as:

$$h_{tc(x,y,z)} = f(v, T_{qm}, t, \ldots)$$

where $h_{tc(x,y,z)}$ is one of the heat transfer coefficients specific to one of the dimensional elements defined by length (x), width (y), and depth (z), v is a velocity of a water quench media utilized during the simulated water quenching, $T_{qm}$ is a temperature of the quench media at a time during the simulated quenching process, and t is a time of the simulated quenching process at which the heat transfer coefficient is calculated.

9. The system of claim 7, wherein the dimensional elements respectively comprise a second-order tetrahedron element.

10. The system of claim 1, wherein the heat transfer module optimizes the virtual surface node-specific, element-specific, and zone-specific heat transfer coefficients by minimizing differences between virtual temperatures calculated during the simulated quenching process by at least one virtual thermocouple and experimental temperatures measured during the quenching process by at least one thermocouple.

11. The system of claim 10, wherein the differences between the virtual temperatures and the experimental temperatures are minimized by adjusting surface node-specific, element-specific, and zone-specific heat transfer coefficients and a length of time interval during the simulated water quenching.

12. The system of claim 10, wherein the differences between the virtual temperatures and the experimental temperatures are determined using an equation expressed as:

$$\text{Error} = \sum_{i=1}^{N} \sqrt{\sum_{j=1}^{M} (T_{i,j}^{calc} - T_{i,j}^{expt})^2}$$

where $T_{i,j}^{calc}$ is a temperature of the virtual aluminum casting measured at a time step j of the simulated quenching at thermocouple i, $T_{i,j}^{expt}$ is a temperature of the aluminum casting measured at a time step j of the quenching at thermocouple i, M is a total number of comparisons made for a specific thermocouple, and N is a total number of thermocouples.

13. The system of claim 1, wherein the virtual node-specific, element-specific, and zone-specific temperatures are expressed as:

$$T_{(x,y,z)} = f(h_{tc}, K, t)$$

where $T_{(x,y,z)}$ refers to the temperature of a specific virtual node, element, and zone, $h_{tc}$ refers to the heat transfer coefficient of the respective virtual surface node, element, and zone, K refers thermal conductivity, and t refers to the time during the quenching at which the heat transfer coefficient was calculated.

14. The system of claim 1, wherein the total strain is determined from intrinsic strength $\hat{\sigma}_e$, strain hardening $\hat{\sigma}_p$, and precipitate hardening $\hat{\sigma}_{ppt}$, and is expressed as:

$$\frac{\sigma}{\mu(T)} = C_e(\dot{\epsilon}, T)\frac{\hat{\sigma}_e}{\mu_0} + C_p(\dot{\epsilon}, T)\frac{\hat{\sigma}_p}{\mu_0} + C_{ppt}(\dot{\epsilon}, T)\frac{\hat{\sigma}_{ppt}}{\mu_0}$$

where $C_e(\dot{\epsilon},T)$, $C_p(\dot{\epsilon},T)$, and $C_{ppt}(\dot{\epsilon},T)$ are velocity-modified temperatures for intrinsic strength, strain hardening, and precipitate hardening, respectively; T is the temperature measured in Kelvin and $\dot{\epsilon}$ is the strain rate; $\mu_0$ (=28.815 GPa) is a reference modulus value at 0 K and $\dot{\epsilon}=10^7$ s$^{-1}$ for the aluminum casting; and $\mu(T)$ is a temperature-dependent shear modulus.

15. The system of claim 14, wherein, after yield, flow stress is modeled through evolution of $\hat{\sigma}_p$ and $\hat{\sigma}_{ppt}$ where strain hardening is expressed as:

$$\hat{\sigma}_p = \hat{\sigma}'_p + \frac{\mu(T)}{\mu_0}\theta_0\left[1 - \frac{\hat{\sigma}'_p}{\hat{\sigma}_{os}}\right]d\epsilon$$

where $\theta_0$ represents the slope of the stress-strain relationship at yield in the reference state (0 K, $\dot{\epsilon}=10^7$ s$^{-1}$); $\hat{\sigma}_{os}$ is a parameter of one of the material properties; $\hat{\sigma}'_p$ is plastic stress in a reference state at 0 K; $\mu_0$(=28.815 GPa) is a reference modulus value at 0 K; $\mu(T)$ is a temperature-dependent shear modulus; and $d\epsilon$ is the change of strain.

16. The system of claim 14, wherein, after yield, precipitate hardening is expressed as:

$$\hat{\sigma}_{ppt} = \frac{M}{b}\frac{\int_0^\infty f(r_{eq})F(r_{eq})dr_{eq}}{\int_0^\infty f(l)dl}$$

where M is the Taylor factor; b is the Burgers vector; $r_{eq}$ and l are precipitate equivalent circle radius ($r_{eq}$=0.5 $d_{eq}$) and spacing on the dislocation line, respectively; $f(r_{eq})$ is a precipitate size distribution; f(l) is a particle spacing distribution; and $F(r_{eq})$ is an obstacle strength of a precipitate of radius $r_{eq}$.

17. The system of claim 1, wherein the change in strain $d\epsilon$ at the respective integration points are calculated from differences in the time-specific, virtual node-specific, element-specific, and zone-specific temperatures and a geometric structure of the respective virtual nodes, elements and zones with an assumption of zero plastic strains, where the change in strain is expressed as:

$$d\epsilon = \frac{\sqrt{2}}{3}\sqrt{\begin{array}{c}(d\epsilon_{11} - d\epsilon_{22})^2 + (d\epsilon_{11} - d\epsilon_{33})^2 + (d\epsilon_{22} - d\epsilon_{33})^2 + \\ 6*d\epsilon_{12}^2 + 6*d\epsilon_{23}^2 + 6*d\epsilon_{13}^2\end{array}}$$

where $d\epsilon_{ij}$ is one of six components of changes in strain at the respective integration points; $d\epsilon_{11}$ is the change strain in x direction; $d\epsilon_{22}$ is the change strain in y direction; $d\epsilon_{33}$ is the change strain in z direction; $d\epsilon_{12}$ is the change strain in xy direction; $d\epsilon_{13}$ is the change strain in xz direction; $d\epsilon_{23}$ is the change strain in yz direction.

18. The system of claim 17, wherein, the strain rate $\dot{\epsilon}$ is calculated based on the change in strain at the respective integration points and is expressed as:

$$\dot{\epsilon} = \frac{d\bar{\epsilon}}{dt}$$

where $d\bar{\epsilon}$ is the change in equivalent strain at the respective integration points, and dt is a time increment separating consecutive time-specific, virtual node-specific, element-specific, and zone-specific temperatures.

19. The system of claim 1, wherein the strain and stress analysis module in communication with the user material subroutine module calculates a plurality of thermal stresses and strains at the respective integration points by calculating trial elasticity, flow stress, and plastic flow, by obtaining equivalent plastic strains and hardening rates and a Jacobian Matrix for plasticity, and by calculating plasticity.

20. The system of claim 19, wherein the user material subroutine module calculates the trial elastic stress using fully elastic strains provided by the system, where the trial elastic stress is expressed as:

$$\sigma_{ij} = \lambda\delta_{ij}\epsilon^{el}_{kk} 2\mu\epsilon^{el}_{kk}$$

where $\epsilon^{el}_{kk}$ is the driving variable calculated from a change in temperature and a geometric structure of the virtual aluminum casting; $\sigma_{ij}$ is one of six components of trial elastic stress; $\lambda$ and $\mu$ are material constants in elastic state; $\delta_{ij}$ is the elastic tensor; and i, j and k are integrals varying from 1, 2 and 3.

21. The system of claim 20, wherein the strain and stress analysis module in communication with the user material subroutine module calculates the Von Mises stress $\bar{\sigma}$ based on purely elastic behavior and expressed as:

$$\bar{\sigma} = \sqrt{\begin{array}{c}\frac{1}{2}((\sigma_{11} - \sigma_{22})^2 + (\sigma_{11} - \sigma_{33})^2 + (\sigma_{22} - \sigma_{33})^2 + \\ 6*\sigma_{12}^2 + 6*\sigma_{23}^2 + 6*\sigma_{13}^2)\end{array}}$$

$$= \sqrt{\frac{3}{2}S_{ij}S_{ij}}$$

$$= \sqrt{\frac{3}{2}((S_{11})^2 + (S_{33})^2 + (S_{22})^2 + 2*S_{12}^2 + 2*S_{23}^2 + 2*S_{13}^2)}$$

where $S_{ij} = S_{ij} - \frac{1}{3}\delta_{ij}\sigma_{kk}$ and $S_{ij}$ is one of six components of deviatoric stress; $\lambda$ and $\mu$ are material constants in elastic state; $\delta_{ij}$ is the elastic tensor; i, j and k are integrals varying from 1, 2 and 3; $\sigma_{11}$ is the elastic stress in x direction; $\sigma_{22}$ is the elastic stress in y direction; $\sigma_{33}$ is the elastic stress in z direction; $\sigma_{12}$ is the elastic stress in xy direction; $\sigma_{13}$ is the elastic stress in xz direction; and $\sigma_{23}$ is the elastic stress in yz direction.

22. The system of claim 21, wherein the user material subroutine module determines whether a predicted elastic stress is larger than an experimentally determined yield stress $\sigma_y$ so that plastic flow occurs, where the predicted change of plastic strain $\dot{\epsilon}_{ij}^{pl}$ is expressed as:

$$\dot{\varepsilon}_{ij}^{pl} = \frac{3S_{ij}}{2\sigma_y}\dot{\bar{\varepsilon}}^{pl}$$

where $S_{ij}$ is one of six components of deviatoric stress; $\dot{\bar{\epsilon}}_{ij}^{pl}$ is one of six components of change of equivalent plastic strain; i, j and k are integrals varying from 1, 2 and 3; and $\sigma_y$ is the yield stress.

23. The system of claim 22, wherein the user material subroutine module uses a backward Euler method to integrate equations for a calculation of actual plastic strain $\sigma_y(\bar{\epsilon}^{pl})$:

$$\bar{\sigma}^{pr} - 3\mu\Delta\bar{\epsilon}^{pl} = \sigma_y(\bar{\epsilon}^{pl})$$

where $\bar{\sigma}^{pr}$ is equivalent plastic stress; $\Delta\bar{\epsilon}^{pl}$ is the increment of equivalent plastic strain; $\bar{\epsilon}^{pl}$ is the equivalent plastic strain; $\sigma_y$ is the yield stress; and $\mu$ is the material constant in elastic state.

24. The system of claim 23, wherein the user material subroutine module calculates updated thermal stresses and strains, where:

$$\sigma_{ij} = \eta_{ij}\sigma_y + \frac{1}{3}\delta_{ij}\sigma_{kk}^{pr}$$

$$\Delta\varepsilon_{ij}^{pl} = \frac{3}{2}\eta_{ij}\Delta\bar{\varepsilon}^{pl}$$

$$\eta_{ij} = \frac{S_{ij}^{pr}}{\bar{\sigma}^{pr}}$$

where $\sigma_{ij}$ is one of six components of thermal stress; $\sigma_{kk}^{pr}$ is plastic stress; $\Delta\bar{\epsilon}^{pl}$ is the increment of equivalent plastic strain; $\Delta\epsilon_{ij}^{pl}$ is one of six components of the increment of plastic strain; $\eta_{ij}$ is one of six components of plastic flow criterion; $S_{ij}^{pr}$ is one of six components of plastic deviatoric stress; $\bar{\sigma}^{pr}$ is equivalent plastic stress; $\sigma_y$ is the yield stress; and i, j and k are integrals varying from 1, 2 and 3.

25. The system of claim 24, wherein the user material subroutine module calculates a Jacobian Matrix at the respective integration points to solve respective plasticity, where:

$$\Delta\dot{\sigma}_{ij} = \lambda^*\delta_{ij}\Delta\dot{\varepsilon}_{kk} + 2\mu^*\Delta\dot{\varepsilon}_{ij} + \left(\frac{h}{1+h/3\mu} - 3\mu^*\right)\eta_{ij}\eta_{kl}\Delta\dot{\varepsilon}_{kl}$$

where $\mu^* = \mu\sigma_y/\bar{\sigma}^{pr}$, $\lambda^* = k - \frac{2}{3}\mu^*$;

plastic hardening coefficient $h = d\sigma_y/d\bar{\epsilon}^{pl}$; $\Delta\dot{\sigma}_{ij}$ is one of six components of change of stress increment; $\Delta\dot{\epsilon}_{ij}$ is one of six components of change of strain; $\Delta\dot{\epsilon}_{kk}$ is one of three components of change of strain; $\Delta\dot{\epsilon}_{kl}$ is one of six components of change of strain; $\bar{\sigma}^{pr}$ is equivalent plastic stress; $d\bar{\epsilon}^{pl}$ is the change of equivalent plastic strain; $\sigma_y$ is the yield stress; $d\sigma_y$ is the change of yield stress; and i, i, k and l are integrals varying from 1, 2 and 3.

26. The system of claim 1, wherein the residual stress calculated by the material constitutive model is expressed as:

$$\sigma_r = f(\Delta\epsilon, T, \dot{\epsilon}, SDAS)$$

where T is the temperature measured in Kelvin; $\dot{\epsilon}$ is the strain rate; SDAS is secondary dendrite arm spacing; $\Delta\epsilon$ is the change of strain; and $\sigma_r$ is the residual stress.

27. A method of predicting at least one of residual stresses and distortion of an aluminum casting, the method comprising:
providing the aluminum casting, the aluminum casting comprising at least one of a plurality of at least one of nodes, elements, and zones and has been quenched via a quenching process;
simulating a quenching process of a virtual aluminum casting replicative of the aluminum casting and the quenching thereof, wherein the virtual aluminum casting comprises at least one of a plurality of virtual surface zones correlated with the nodes, elements, and/or zones of the aluminum casting and the virtual surface zones respectively comprise a plurality of dimensional elements and the dimensional elements respectively comprise a plurality of nodes;
calculating a plurality of heat transfer coefficients specific to the respective virtual surface nodes, elements, and zones;
calculating a plurality of at least one of virtual node-specific, element-specific, and zone-specific temperatures using the respective surface node-specific, element-specific, and/or zone-specific heat transfer coefficients, the virtual node-specific, element-specific, and/or zone-specific temperatures respectively specific to a time of the simulated quenching;
calculating a total strain of the respective virtual nodes, elements, and/or zones to define at least one of a virtual node-specific, element-specific, and zone-specific stress-strain curve using the virtual node-specific, element-specific, and zone-specific temperatures and a coefficient of thermal expansion/contraction;
calculating a plurality of thermal stresses and strains at integration points defining the dimensional elements of the respective virtual zones;
calculating a strain rate and a change in strain at the respective integration points;
calculating at least one of a residual stress and distortion at the respective integration points; and
predicting at least one residual stress and distortion of the aluminum casting.

28. An article of manufacture to predict at least one of a residual stress and distortion of an aluminum casting, the article of manufacture comprising an information input, an information output, and at least one non-transitory computer usable medium, wherein:
the information input is configured to receive information relating to at least one of a plurality of at least one of nodes, elements, and zones of the aluminum casting during a quenching thereof;
the information output is configured to convey information relating to at least one of the residual stress and distortion of the aluminum casting predicted by the article of manufacture;
the computer useable medium comprises computer-readable program code means embodied therein for simulating a quenching of a virtual aluminum casting replicative of the aluminum casting and the quenching thereof, the virtual aluminum casting comprising at least one of a plurality of virtual surface nodes, elements, and zones correlated with at least one of the nodes, elements, and zones of the aluminum casting and the virtual surface zones respectively comprising a plurality of dimensional elements and virtual dimensional elements respectively comprising a plurality of nodes;

the computer useable medium comprises computer-readable program code means embodied therein for calculating a plurality of heat transfer coefficients specific to the respective virtual surface nodes, elements, and zones;

the computer useable medium comprises computer-readable program code means embodied therein for calculating a plurality of at least one of virtual node-specific, element-specific, and zone-specific temperatures using the heat transfer coefficients, the virtual node-specific, element-specific, and zone-specific temperatures respectively specific to a time of the simulated quenching;

the computer useable medium comprises computer-readable program code means embodied therein for calculating a total strain of the respective virtual nodes, elements, and/or zones to define at least one of a virtual node-specific, element-specific, and/or zone-specific stress-strain curve using the virtual node-specific, element-specific, and/or zone-specific temperatures and a coefficient of thermal expansion/contraction;

the computer useable medium comprises computer-readable program code means embodied therein for calculating a plurality of thermal stresses and strains at integration points defining the dimensional elements of the respective virtual zones;

the computer useable medium comprises computer-readable program code means embodied therein for calculating a strain rate and a change in strain at the respective integration points;

the computer useable medium comprises computer-readable program code means embodied therein for calculating at least one of a residual stress and distortion at the respective integration points to predict at least one residual stress and distortion of the aluminum casting; and the computer useable medium is cooperative with the information input and the information output such that the received information is operated upon by the computer-readable program code means to be presented to the information output as a prediction of at least one of the residual stress and distortion of the aluminum casting.

* * * * *